(12) United States Patent
Aldana et al.

(10) Patent No.: US 9,867,004 B2
(45) Date of Patent: Jan. 9, 2018

(54) BROADCAST TIME-OF-DEPARTURE (TOD) FRAME FORMAT

(71) Applicant: QUALCOMM Incorporated, San Diego, CA (US)

(72) Inventors: Carlos Horacio Aldana, Mountain View, CA (US); Ning Zhang, Saratoga, CA (US); James Simon Cho, Mountain View, CA (US); Xiaoxin Zhang, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/080,337

(22) Filed: Mar. 24, 2016

(65) Prior Publication Data
US 2017/0188191 A1    Jun. 29, 2017

Related U.S. Application Data

(60) Provisional application No. 62/387,294, filed on Dec. 23, 2015.

(51) Int. Cl.
*H04W 24/00* (2009.01)
*H04W 4/02* (2009.01)
(Continued)

(52) U.S. Cl.
CPC .............. *H04W 4/023* (2013.01); *G01S 5/14* (2013.01); *H04L 27/266* (2013.01); *H04W 4/02* (2013.01);
(Continued)

(58) Field of Classification Search
CPC ... H04W 4/023; H04W 4/02; H04W 56/0015; H04W 56/0025; H04L 27/266; G01S 5/14
(Continued)

(56) References Cited

U.S. PATENT DOCUMENTS

2007/0226351 A1* 9/2007 Fischer ............... H04W 76/023
  709/227
2013/0337831 A1* 12/2013 Edge ....................... H04W 4/02
  455/456.1

(Continued)

FOREIGN PATENT DOCUMENTS

WO      2014182800 A1    11/2014

OTHER PUBLICATIONS

International Search Report and Written Opinion—PCT/US2016/060154—ISA/EPO—dated Jan. 25, 2017.

*Primary Examiner* — Khai M Nguyen
(74) *Attorney, Agent, or Firm* — Kilpatrick Townsend & Stockton, LLP

(57) ABSTRACT

Disclosed herein are techniques for range measurement between one or more wireless stations (STAs) and a first access point (AP). In various embodiments, the first AP may synchronize a clock of the first AP with clocks of one or more synchronized APs. The first AP may perform a synchronization session with the one or more STAs. The first AP may also transmit one or more Broadcast time-of-departure (TOD) frames to the one or more STAs. Each of the one or more Broadcast TOD frames may include a time of departure of a Broadcast TOD frame from the first AP. A second AP and a third AP of the one or more synchronized APs may also transmit one or more Broadcast TOD frames to the one or more STAs for range and/or position determination.

30 Claims, 17 Drawing Sheets

(51) Int. Cl.
*H04W 56/00* (2009.01)
*H04L 27/26* (2006.01)
*G01S 5/14* (2006.01)

(52) U.S. Cl.
CPC ... *H04W 56/0015* (2013.01); *H04W 56/0025* (2013.01)

(58) Field of Classification Search
USPC .................. 455/456.5, 456.1, 456.6, 456.2
See application file for complete search history.

(56) References Cited

U.S. PATENT DOCUMENTS

| | | |
|---|---|---|
| 2014/0045522 A1 | 2/2014 | Sugar et al. |
| 2014/0187259 A1 | 7/2014 | Kakani et al. |
| 2014/0233550 A1* | 8/2014 | Hansen ................ H04W 4/023 370/338 |
| 2014/0295877 A1 | 10/2014 | Hart |
| 2014/0334401 A1* | 11/2014 | Zhang ................ G01S 5/0236 370/329 |
| 2015/0063228 A1 | 3/2015 | Aldana |
| 2015/0341750 A1* | 11/2015 | Hayes ................ H04W 64/003 370/328 |
| 2015/0350027 A1 | 12/2015 | Raissinia et al. |
| 2016/0249165 A1* | 8/2016 | Aldana ................ H04W 4/023 |

* cited by examiner

| RTT TSF Timestamp | TOD of Previous Beacon | Format and BW | ppm Estimate (Optional) | Transmit Power | Neighbor Report (Optional) | LCI Report | Vendor Specific |

| RTT TSF Timestamp | Fractional TSF Timestamp | Format and BW | ppm Estimate (Optional) | Transmit Power | Neighbor Report (Optional) | LCI Report | Vendor Specific |

| RTT TSF Timestamp | TOD of Previous Beacon | Format and BW | ppm Estimate (Optional) | Transmit Power | Neighbor Report (Optional) | Vendor Specific |

| RTT TSF Timestamp | Fractional TSF Timestamp | Format and BW | ppm Estimate (Optional) | Transmit Power | Neighbor Report (Optional) | Vendor Specific |

| RTT TSF Timestamp | TOD of Previous Beacon | Format and BW | ppm Estimate (Optional) | Transmit Power | FQDN (Optional) | Vendor Specific |

| RTT TSF Timestamp | Fractional TSF Timestamp | Format and BW | ppm Estimate (Optional) | Transmit Power | FQDN (Optional) | Vendor Specific |

| Element ID | Length | BSSID | BSSID Information | Operating Class | Channel Number | PHY Type | Optional Subelements |
|---|---|---|---|---|---|---|---|
| 1 | 1 | 6 | 4 | 1 | 1 | 1 | variable |

Octets:

| Subelement ID | Name | Extensible |
|---|---|---|
| 0 | Reserved | |
| 1 | TSF Information | Yes |
| 2 | Condensed Country String | Yes |
| 3 | BSS Transition Candidate Preference | |
| 4 | BSS Termination Duration | |
| 5 | Bearing | |
| 6 (11aa) | Wide Bandwidth Channel | |
| 7-38 | Reserved | |
| 39 (11aa) | Measurement Report | Subelements |
| 40-44 | Reserved | |
| 45 | HT Capabilities subelement | Yes |
| 46-60 | Reserved | |
| 61 | HT Operation subelement | Yes |
| 62 | Secondary Channel Offset subelement | |
| 63-65 | Reserved | |

| Subelement ID | Length | TSF Offset | Beacon Interval | TSF Offset Frac | ppm Offset |
|---|---|---|---|---|---|
| 1 | 1 | 2 | 2 | 3 | 2 |

Octets

| Subelement ID | Length | TSF Offset Frac | Ppm Offset |
|---|---|---|---|
| 1 | 1 | 3 | 2 |

Octets

| Subelement ID | Length | RTT TSF Offset | Ppm Offset |
|---|---|---|---|
| 1 | 1 | 8 | 2 |

Octets

FIG. 8C

BROADCAST TIME-OF-DEPARTURE (TOD) FRAME FORMAT

CROSS-REFERENCES TO RELATED APPLICATIONS

This patent application claims priority to and the benefit of U.S. Provisional Patent Application Ser. No. 62/387,294, filed Dec. 23, 2015, entitled "BROADCAST ROUND TRIP TIME (RTT) FRAME FORMAT," which is assigned to the assignee hereof and is incorporated herein by reference in its entirety for all purposes.

BACKGROUND

The subject matter disclosed herein relates to mobile device positioning in a wireless communication system. A fine timing measurement (FTM) procedure allows a fixed, portable, or mobile wireless station to obtain its range with respect to another station. In order for a station to determine its absolute location, the station may perform the FTM procedure with multiple stations whose locations are known. In scenarios such as stadiums, airports, and concerts, where a large number of stations may be exchanging unicast FTM frames between one station and another station, the communication medium may be overloaded with the FTM frames.

BRIEF SUMMARY

Some example techniques are presented herein which may be implemented in various methods and apparatuses in mobile devices or access points to possibly provide for or otherwise support range measurement in mobile devices. More specifically, disclosed herein are techniques for fixed, portable, or mobile wireless stations to obtain range measurements using Broadcast time-of-departure (TOD) frames, thus avoiding overloading the communication medium while maintaining privacy.

In accordance with an example implementation, a method of range measurement between one or more wireless stations (STAs) and a first access point (AP) may be provided. The method may comprise synchronizing a clock of the first AP with clocks of one or more synchronized APs; performing a synchronization session by the first AP with the one or more STAs; and transmitting one or more Broadcast TOD frames by the first AP to the one or more STAs. Each of the one or more Broadcast TOD frames may include a time of departure of a Broadcast TOD frame from the first AP. In some embodiments, the method may further comprise transmitting one or more Broadcast TOD frames by a second AP and a third AP of the one or more synchronized APs to the one or more STAs, where each of the one or more Broadcast TOD frames may include a time of departure of a Broadcast TOD frame from the second AP or the third AP.

In accordance with another example implementation, an AP may be provided which comprises a clock, a wireless communication subsystem, and a processing unit communicatively coupled with the clock and the wireless communication subsystem. The processing unit may be configured to: synchronize the clock of the AP with clocks of one or more other APs; perform a synchronization session with one or more STAs; and broadcast one or more Broadcast TOD frames to the one or more STAs through the wireless communication subsystem. Each of the one or more Broadcast TOD frames may include a time of departure of a Broadcast TOD frame from the AP.

In accordance with yet another example implementation, a non-transitory computer-readable storage medium including machine-readable instructions stored thereon for range measurement between one or more STAs and a first AP may be provided. The instructions, when executed by one or more processors, may cause the first AP to synchronize a clock of the first AP with clocks of one or more synchronized APs; perform a synchronization session with the one or more STAs; and transmit one or more Broadcast TOD frames to the one or more STAs. Each of the one or more Broadcast TOD frames may include a time of departure of a Broadcast TOD frame from the first AP.

In accordance with still another example implementation, an apparatus may be provided which may comprise means for synchronizing a clock of a first AP with clocks of one or more synchronized APs; means for performing a synchronization session by the first AP with the one or more STAs; and means for transmitting one or more Broadcast TOD frames by the first AP to the one or more STAs. Each of the one or more Broadcast TOD frames may include a time of departure of a Broadcast TOD frame from the first AP.

In accordance with one example implementation, a method of range measurement between an STA and one or more synchronized APs may be provided. The method comprises performing a synchronization session by the STA with a first AP in a network of synchronized APs; receiving one or more Broadcast TOD frames by the STA from a second AP in the network of synchronized APs, each of the one or more Broadcast TOD frames including a time of departure of a Broadcast TOD frame from the second AP; and determining a range between the STA and the second AP by the STA based on the time of departure of at least one Broadcast TOD frame from the second AP.

In some embodiments of the method of range measurement between the STA and one or more synchronized APs, at least one of the one or more Broadcast TOD frames includes information regarding an accuracy of a timer of the second AP. In some embodiments, the method further comprises adjusting the time of departure of the Broadcast TOD frame from the second AP by the STA, based on the information regarding the accuracy of the timer of the second AP.

In some embodiments of the method of range measurement between the STA and one or more synchronized APs, the method may include receiving one or more Broadcast TOD frames from each of a third AP and a fourth AP in the network of synchronized APs by the STA, where each of the one or more Broadcast TOD frames may include a time of departure of a Broadcast TOD frame from the third AP or the fourth AP. The method may also include determining a range between the STA and the third AP and a range between the STA and the fourth AP based on the time of departure of the one or more Broadcast TOD frames. The method may further include determining an absolute position of the STA based on the range between the STA and the second AP, the range between the STA and the third AP, and the range between the STA and the fourth AP.

In accordance with still another example implementation, a mobile device may be provided which comprises a clock, a wireless communication subsystem, and a processing unit communicatively coupled with the clock and the wireless communication subsystem. The processing unit may be configured to perform a synchronization session with a first AP in a network of synchronized APs and receive one or more Broadcast TOD frames from a second AP in the network of synchronized APs through the wireless communication subsystem, where each of the one or more Broadcast TOD frames may include a time of departure of a Broadcast TOD frame from the second AP. The processing unit may also be configured to determine a range between the STA and the second AP based on the time of departure of at least one Broadcast TOD frame from the second AP.

In accordance with yet another example implementation, a non-transitory computer-readable storage medium including machine-readable instructions stored thereon for range measurement between an STA and one or more synchronized APs may be provided. The instructions, when executed by one or more processors, may cause the STA to perform a synchronization session with a first AP in a network of synchronized APs; receive one or more Broadcast TOD frames from a second AP in the network of synchronized APs, each of the one or more Broadcast TOD frames including a time of departure of a Broadcast TOD frame from the second AP; and determine a range between the STA and the second AP based on the time of departure of at least one Broadcast TOD frame from the second AP.

In accordance with still another example implementation, an apparatus may be provided which may comprise means for performing a synchronization session with a first AP in a network of synchronized APs; means for receiving one or more Broadcast TOD frames from a second AP in the network of synchronized APs, where each of the one or more Broadcast TOD frames includes a time of departure of a Broadcast TOD frame from the second AP; and means for determining a range between the STA and the second AP based on the time of departure of at least one Broadcast TOD frame from the second AP.

BRIEF DESCRIPTION OF THE DRAWINGS

Aspects of the present disclosure are illustrated by way of example. Non-limiting and non-exhaustive aspects are described with reference to the following figures, wherein like reference numerals refer to like parts throughout the various figures unless otherwise specified.

FIG. 4A illustrates a Broadcast time-of-departure (TOD) frame according to some embodiments of the present disclosure.

FIG. 4B illustrates a variation of a Broadcast TOD frame according to some embodiments of the present disclosure.

FIG. 5A illustrates a Broadcast TOD frame according to some embodiments of the present disclosure.

FIG. 5B illustrates a variation of a Broadcast TOD frame according to some embodiments of the present disclosure.

FIG. 6A illustrates a Broadcast TOD frame according to some embodiments of the present disclosure.

FIG. 6B illustrates a variation of a Broadcast TOD frame according to some embodiments of the present disclosure.

FIG. 7A illustrates an example Neighbor Report field in an example Broadcast TOD frame.

FIG. 7B illustrates examples of optional subelements in a Neighbor Report field in a Broadcast TOD frame.

FIG. 8A illustrates a subelement in a Neighbor Report field in a Broadcast TOD frame according to some embodiments of the present disclosure.

FIG. 8B illustrates a subelement in a Neighbor Report field in a Broadcast TOD frame according to some embodiments of the present disclosure.

FIG. 8C illustrates a subelement in a Neighbor Report field in a Broadcast TOD frame according to some embodiments of the present disclosure.

DETAILED DESCRIPTION

Figure 1A:
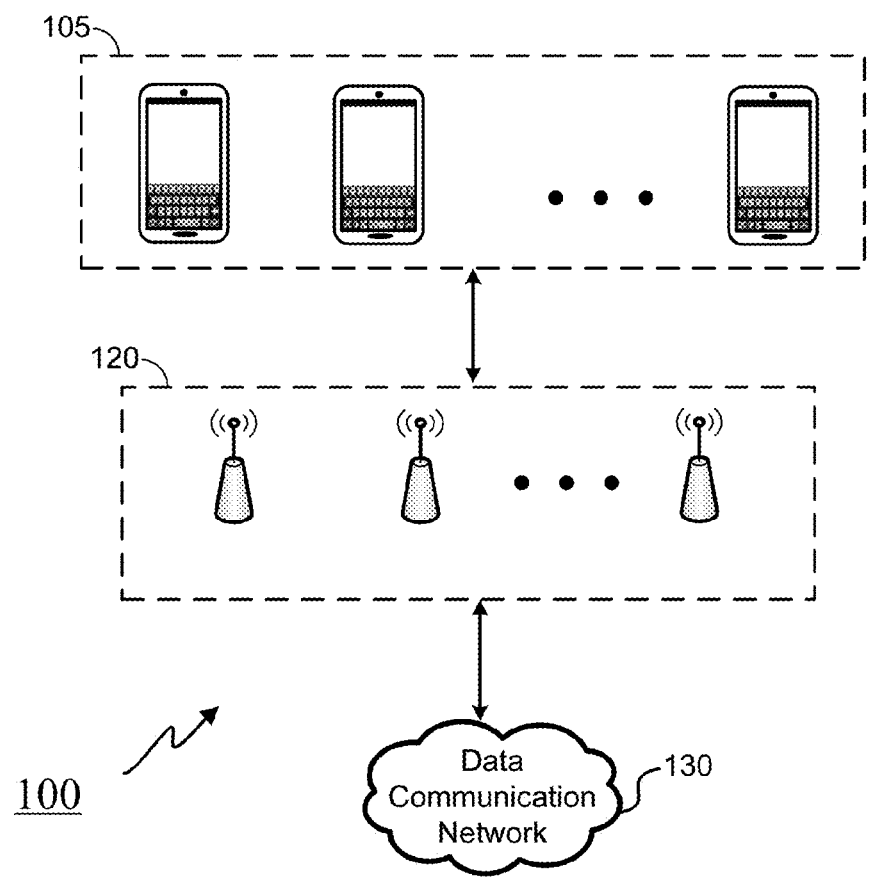
FIG. 1A is a system diagram of a wireless communication system, according to one embodiment.

Several illustrative embodiments will now be described with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Some example techniques are presented herein which may be implemented in various methods and apparatuses in a mobile device or access points to possibly provide for or otherwise support range measurements without overloading the communication medium while maintaining privacy capability. The techniques involve broadcasting Broadcast time-of-departure (TOD) frames from one or more synchronized access points (APs) or fixed, portable, or mobile wireless stations (STAs). The following description may refer to a device that is configured to broadcast Broadcast TOD frames as an AP. However, a person of ordinary skill in the art will understand that an STA may act as an AP and may be configured to broadcast Broadcast TOD frames.

Currently, in order for an STA to obtain its absolute position, the STA may perform fine timing measurement (FTM) sessions with multiple STAs whose locations are known. An FTM session is an instance of a fine timing measurement procedure between an initiating STA and a responding STA. An FTM session may include a negotiation, measurement exchange and termination processes. Fine timing measurement procedures allow an STA to obtain its range to another STA.

In many cases, to determine a range between an STA and each of multiple STAs or APs, an STA might have multiple concurrent FTM sessions. Concurrent FTM sessions might occur with responding STAs that are members of different basic service sets (BSSes) and possibly different extended service sets (ESSes), or possibly outside of a BSS, each session using its own scheduling, channel and operational parameters. A responding STA might be requested to establish FTM sessions with a large number of initiating STAs. For example, an AP may perform FTM procedures with STAs at a mall or a store for range measurements. On the other hand, an initiating STA might have multiple ongoing FTM sessions on the same or different channels with different responding STAs, while being associated with an AP for the exchange of data or signaling.

Therefore, in situations where a large number of STAs may be present and in use, such as a stadium, a theater, a shopping mall, or an airport, the communication bandwidth may be consumed and overloaded with the FTM frames exchanged among STAs and APs. Therefore, a new communication method may be desirable for STAs to obtain range information without overloading the communication medium while maintaining privacy.

Techniques disclosed herein provide Broadcast TOD frames from one or more synchronized APs or STAs to one or more STAs for range and/or position determination. The Broadcast TOD frames may include the time of departure of the Broadcast TOD frames from the broadcasting APs, and location information of the broadcasting APs. From the received Broadcast TOD frames, an STA may also obtain information such as the ppm estimate of a timer of an AP, and TSF offset or ppm offset of each AP with respect to neighbor APs, such that the STA can correct the timing of each AP by synchronizing with only one of the APs, without having to synchronize with each AP separately through an individual FTM procedure. In this way, a receiving STA may determine the time of flight (TOF) of the received Broadcast TOD frames and therefore its range to the broadcasting APs, based on the corrected synchronization between the receiving STA and neighboring APs, the TOD of the Broadcast TOD frames from the broadcasting APs, and the time of arrival (TOA) of the Broadcast TOD frames at the receiving STA. The receiving STA may then determine its absolute position based on its range to the broadcasting APs and the location information of the broadcasting APs. Because the receiving STA transmits FTM frames to one AP only for synchronization and is in receive mode most of the time, privacy of the STA may be better protected than performing FTM procedures with multiple APs.

I. Wireless Communication Systems

Wireless communication systems may comprise wireless devices and APs, which allow the wireless devices to connect to a wired or wireless network using one or more wireless standards. An AP is generally referred to as an entity that includes one STA and provides access to distribution services via wireless medium for associated STAs. Thus, an STA may act as an AP. An STA is a logical entity that includes a singly addressable instance of a medium access control (MAC) and a physical layer (PHY) interface to the wireless medium. Some wireless communication systems may allow wireless devices to be configured as STAs that can communicate between one another or through the APs. Standards such as IEEE 802.11ac, 802.11ad, 802.11v, 802.11REVmc, etc. are commonly used for such communications.

IEEE 802.11 is a set of media access control and physical layer specifications for implementing wireless local area network (WLAN) communication, called Wi-Fi, in the unlicensed (2.4, 3.6, 5, and 60 GHz) frequency bands. Wi-Fi plays an important role in the growing application of Indoor Location. The key applicable Wi-Fi technology in Indoor Location is ranging using time-of-flight (TOF) ranging measurements defined in IEEE 802.11, because distances between devices can be used to determine device location.

In IEEE 802.11REVmc, fine timing measurement protocol is proposed for ranging. In FTM protocol, an initiating station exchanges FTM frames with a responding station to measure the time-of-flight or the round trip time (RTT). The initiating station computes its range to the responding station after receiving fine timing measurements (i.e., timestamps corresponding to the departure time of the FTM frame from the responding station and the arrival time of its corresponding acknowledgment (ACK) frame at the responding station) from the responding station. In FTM positioning, the initiating station exchanges FTM frames with multiple responding APs for TOF measurements in order to determine its absolute location. For example, in 3-dimensional positioning, the initiating station exchanges FTM frames with at least three APs in order to determine its absolute location.

FIG. 1A is a simplified illustration of a wireless communication system 100, according to one embodiment. Wireless communication system 100 can include one or more STA(s) 105, AP(s) 120, and a data communication network 130. It should be noted that FIG. 1A provides only a generalized illustration of various components, any or all of which may be utilized as appropriate. Furthermore, components may be rearranged, combined, separated, substituted, and/or omitted, depending on desired functionality. For example, although only a few STAs 105 and APs are illustrated in wireless communication system 100 illustrated in FIG. 1A, embodiments may include a smaller or larger number of either or both STAs and/or APs. For instance, embodiments may include dozens, hundreds, thousands, or more of either or both STAs and/or APs. In addition, STA(s) 105 and/or AP(s) 120 may be connected with one or more additional networks, such as cellular carrier networks, satellite positioning networks, and the like which can have a variety of components (e.g., servers, satellites, base stations, etc.) that are not illustrated in FIG. 1A. A person of ordinary skill in the art will recognize many modifications to the embodiment illustrated.

A wireless device or STA, as described herein, may comprise a system, a subscriber unit, a subscriber station, a fixed station, a portable station, a mobile station, a remote mobile station, a remote terminal, a mobile device, a user terminal, a terminal, a wireless communication device, a user agent, a user device, a user equipment (UE), or an access point. For example, an STA can be a cellular telephone, a cordless telephone, a session initiation protocol (SIP) phone, a wireless local loop (WLL) station, a personal digital assistant (PDA), a handheld device having wireless connection capability, a computing device, or other processing device connected to a wireless modem.

Techniques described herein may apply more generally to any wireless devices, including STAs, APs and/or other wireless devices.

As mentioned above, STA(s) 105 can communicate with AP(s) 120, which can enable STA(s) 105 to communicate through data communication network 130. Communication to and from STA(s) 105 may thus be implemented, in some embodiments, using various wireless communication standards and/or protocols, which may be determined by data communication network 130. Some embodiments can include, for example, one or more of the IEEE 802.11 family of standards as discussed above. Data communication network 130 may comprise one or more of a variety of networks, including local networks such as a local area network (LAN) or a personal area network (PAN), a wide area network (WAN) such as the Internet, and/or any of a variety of public and/or private communication networks. Moreover, networking technologies can include switching and/or packetized networks utilizing optical, radio frequency (RF), wired, satellite, and/or other technologies.

Wireless communication system 100 may provide positioning capabilities to calculate or estimate the location of one or more STAs 105. Such capabilities can include a satellite positioning system (SPS), such as the Global Positioning System (GPS), and/or triangulation and/or trilateration provided by stationary components, such as AP(s) 120. Additionally or alternatively, when there is a plurality of STAs 105 in a wireless communication system 100, STAs 105 may be configured to provide positioning capabilities based on their determined distance from one another. In positioning or location based applications using an IEEE 802.11 standard, the determination of round trip time for pre-specified messages or dialogs between two STAs, for example, can be used to provide an indication of distance between the two STAs.

Each STA 105 or AP 120 can include at least one local clock, on which STA 105 or AP 120 bases its communication and data processing. However, it is usually not possible to precisely synchronize the local clocks among the several STAs or APs, and therefore, each local clock may have its own timing error or clock drift relative to clocks of other STAs or APs.

Figure 1B:
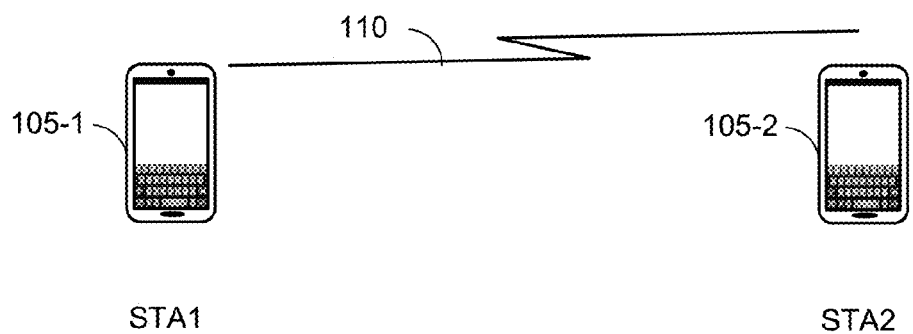
FIG. 1B illustrates an example setup in which stations may obtain range measurements.

FIG. 1B illustrates an example setup in which STAs may obtain range measurements, according to one embodiment. Here, two STAs (STA1 105-1 and STA2 105-2) can communicate with each other using wireless communication signals 110. STAs 105 may be part of a larger system, such as wireless communication system 100 illustrated in FIG. 1A. To obtain the RTT and estimated distance from one STA to the other, STAs 105 may engage in an exchange of fine timing measurement frames and acknowledgements, as described below.

Figure 1C:
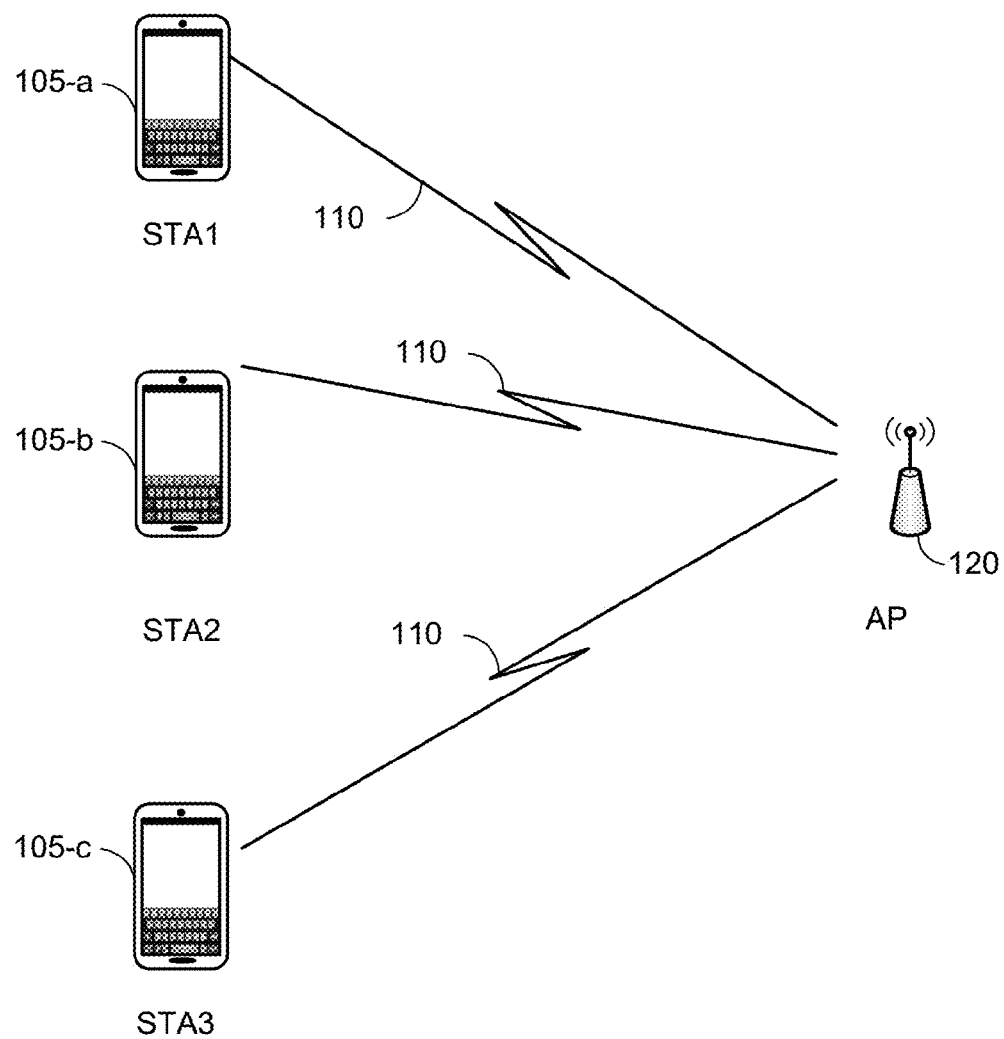
FIG. 1C illustrates another example setup in which stations may obtain range measurements.

FIG. 1C is another example setup in which STAs may obtain range measurement. Here, an AP can communicate with three STAs—STA1 105-*a*, STA2 105-*b*, and STA3 105-*c*—using wireless communication signals 110. The wireless communication signals 110 may include uplink (UL) and/or downlink (DL) frames. STAs may additionally communicate directly with each other via similar means. Additional STAs and/or APs (not shown) may be part of the same wireless system (e.g., WLAN). Some wireless systems may have more or fewer STAs. It will be understood that the techniques described herein may be utilized in systems having different configurations and/or components than those shown. Moreover, wireless systems may include other types of wireless devices. A person of ordinary skill in the art will recognize these and other variations to the embodiments shown in FIGS. 1A-1C. The STAs and/or APs can correspond with wireless devices and/or may incorporate components of a computer, such as computing systems, described below, for example, with respect to FIGS. 10 and 11 of the present disclosure.

In general, embodiments described herein may pertain to wireless communications for devices utilizing a wireless communication system 100, such as a WLAN, according to various IEEE 802.11 communication standards. Some embodiments may utilize standards other than the IEEE 802.11 family of standards. In various embodiments, rather than relying on satellite signals or assistance data from terrestrial base stations transmitting satellite geo-positioning data, STAs may acquire their geographic locations using wireless APs. The APs may transmit and receive wireless signals following various IEEE 802.11 standards, such as 802.11g, 802.11n, 802.11ac, 802.11ad, 802.11v, etc. In some embodiments, STAs may comply with 802.11ac, 802.11v, and/or 802.11REVmc standards while transmitting or receiving signals from multiple antennas. Some embodiments may sample timing signals in 0.1 nanosecond (ns) or 1 picosecond (ps) increments, while some other embodiments may sample signals in time increments of less than 10 ns, such as, for example, 1.5 ns, 2 ns, 0.1 ns, etc., while still complying with the standards.

Embodiments may implement TOD and TOA measurements from IEEE 802.11 standards based on definitions that account for transmitted signals from multiple antennas. In some embodiments, some of the information may be codified in revised 802.11 standards. The APs may transmit and receive timing measurements, such as TOA and TOD measurements, to and from the STAs. When an STA obtains timing measurements from three or more APs along with geographical positioning information of the APs, the STA may be able to determine its location by performing techniques similar to GPS positioning, e.g. trilateration and the like, using the multiple timing measurements. In some cases (e.g., particularly when at least one of the STAs is stationary), the STAs may transmit and receive timing measurements between one another in order to obtain the RTT and the distance between one another.

II. FTM Protocol

In 802.11REVmc, STAs maintain local timing synchronization function (TSF) timers for synchronization or other purposes. The TSF timer counts in increments of microseconds with a maximum counter value of $2^{64}$. The timing synchronization function keeps the TSF timers for all STAs in the same BSS synchronized. STAs in a single infrastructure BSS or an independent BSS (IBSS) are usually synchronized to a common clock. An AP in a BSS may be the timing master for the TSF. An STA contained in the AP generally initializes its TSF timer independent of any simultaneously started APs.

In FTM protocol, there is a need for an initiating STA to have a sense of the TSF of a responding STA or AP for accurate timing measurement. An AP or responding STA may periodically transmit Beacons or announce frames including the value of the AP's TSF timestamp in order to synchronize the TSF timers of other STAs. The length of the Timestamp field is 64 bits or 8 octets. As used herein, a timestamp refers to encoded information indicating the time when a certain event occurs. An STA can synchronize its local TSF timer to the AP or responding STA by constantly receiving and parsing Beacons or announce frames. Alternatively, an initiating STA may actively transmit probe request frames and wait for a probe response that includes time information. If the initiating STA's TSF timer is different from a timestamp in the received Beacon, announce frame or probe response, the initiating STA may set its local TSF timer based on the received timestamp value to synchronize with the responding STA or AP.

Figure 2:
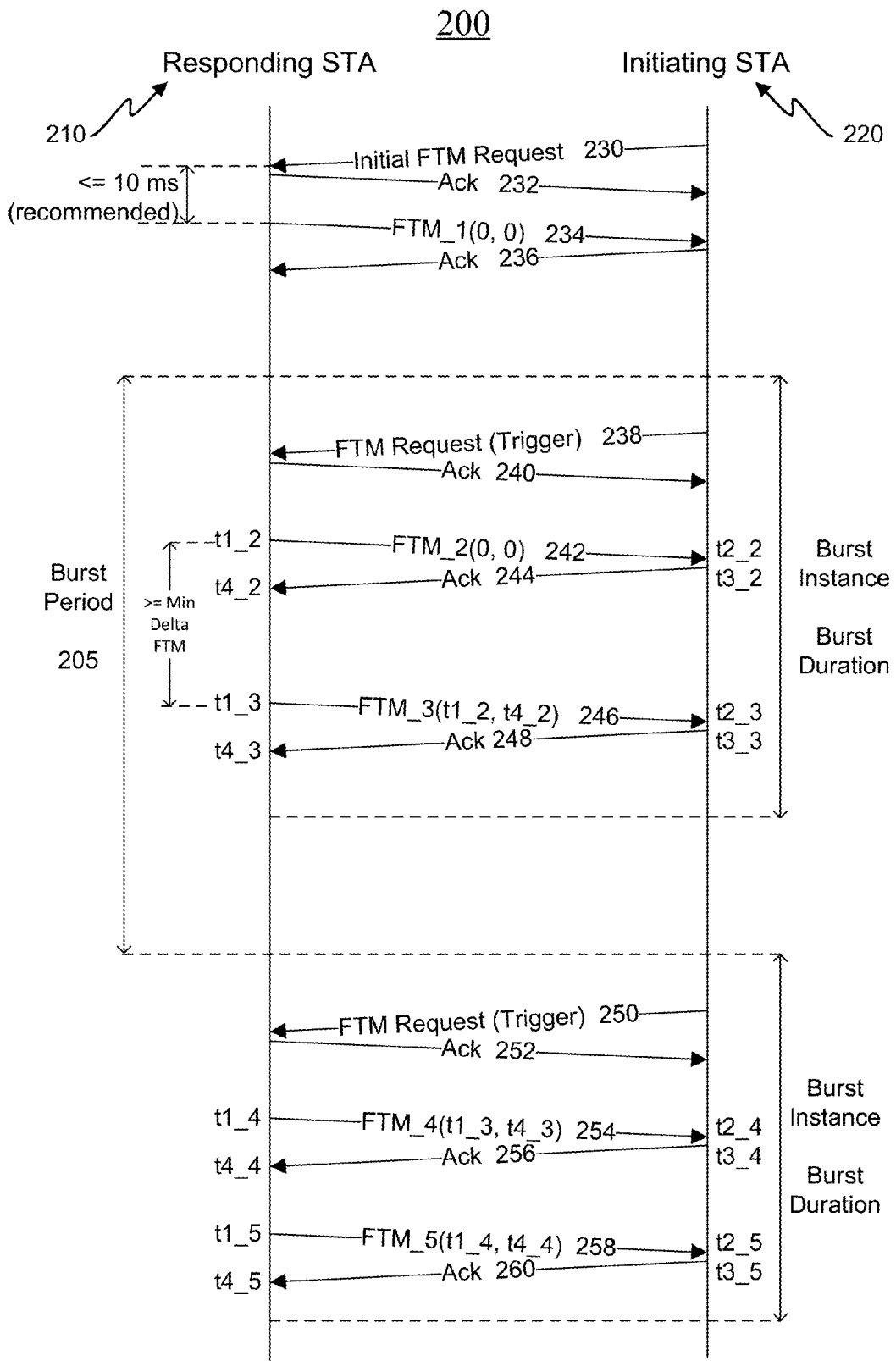
FIG. 2 illustrates a fine timing measurement (FTM) session in IEEE 802.11REVmc.

FIG. 2 illustrates an IEEE 802.11REVmc FTM session 200 with multiple bursts. In order to initiate a fine timing measurement procedure, an STA 220 that supports fine timing measurement protocol as an initiator (referred to as an initiating STA) transmits an initial FTM Request frame 230. An STA 210 that supports the fine timing measurement protocol as a responder (referred to as a responding STA) does not transmit FTM frames to a peer STA unless the peer STA supports the fine timing measurement protocol as an initiator and responding STA 210 has received an initial FTM request frame from the peer STA. Initial FTM request frame 230 may include a trigger field and a set of scheduling parameters in an FTM parameters field that describe the initiating STA's availability for measurement exchange. Responding STA 210 may send an acknowledgement (ACK) frame 232 to initiating STA 220 acknowledging the successful reception of initial FTM request frame 230.

A first FTM frame in FTM session 200 is an initial FTM frame FTM_1 234. Responding STA 210 may generally transmit initial FTM frame FTM_1 234 within 10 ms in response to initial FTM request frame 230. Initial FTM frame FTM_1 234 includes an FTM parameters field. A value of a status indication field in initial FTM frame FTM_1 234 indicates whether the initial FTM request was successful, incapable or failed. Initiating STA 220 acknowledges the receiving of initial FTM frame FTM_1 234 by sending an ACK frame 236.

FTM frames are generally sent during time windows called burst instances. The timing of the burst instances may be defined by the following parameters in the FTM parameters field of an initial FTM request frame or initial FTM frame: (1) a partial TSF timer value for the beginning of the first burst instance; (2) a burst duration—the duration of each burst instance starting at the boundary of a burst period; and (3) a burst period—the interval from the beginning of one burst instance to the beginning of the following burst instance.

As shown in FIG. 2, initiating STA 220 transmits an FTM trigger frame 238 at the beginning of a burst as soon as it is available on channel. This indicates to responding STA 210 availability of initiating STA 220 for the remainder of the burst instance. Following FTM trigger frame 238, responding STA 210 transmits an ACK frame 240, and transmits non-initial FTM frames, such as FTM_2 242 and FTM_3 246, before the burst duration elapses. Initiating STA 220 sends an ACK frame, such as ACK frame 244 or 248, each time an FTM frame is successfully received. Within a burst instance, consecutive FTM frames are spaced at least a Min Delta FTM apart. After a burst period, a next burst instance may start, which includes similar operations as in the first burst instance as indicated by operations 250, 252, 254, 256, 258, and 260.

Within a burst instance, initiating STA 220 may perform fine timing measurement on each FTM frame addressed to it. For example, responding STA 210 transmits FTM frame FTM_2 242, and captures a first time t1_2 when FTM frame FTM_2 242 is transmitted. Initiating STA 220 captures a second time t2_2 when FTM frame FTM_2 242 arrives at initiating STA 220. Additionally, initiating STA 220 captures a third time t3_2 when it transmits ACK frame 244. Responding STA 210 captures a fourth time t4_2 when ACK frame 244 arrives at responding STA 210. Responding STA 210 then sends the captured first time t1_2 and fourth time t4_2 to initiating STA 220 in the next FTM frame FTM_3 246. Initiating STA 220 can then calculate the round trip time (RTT) as RTT=(t4_2−t1_2)−(t3_2−t2_2).

In response to the request by an initiating wireless device, such as initiating STA 220, at least a part of a TSF timer value of a responding wireless device, such as responding STA 210, may be included in one or more FTM frames from the responding wireless device. The initiating wireless device receiving the one or more FTM frames may set its local TSF clock based on the received TSF timer value to synchronize with the responding wireless device.

III. Range Measurement Using Broadcast TOD Frames

Figure 3A:
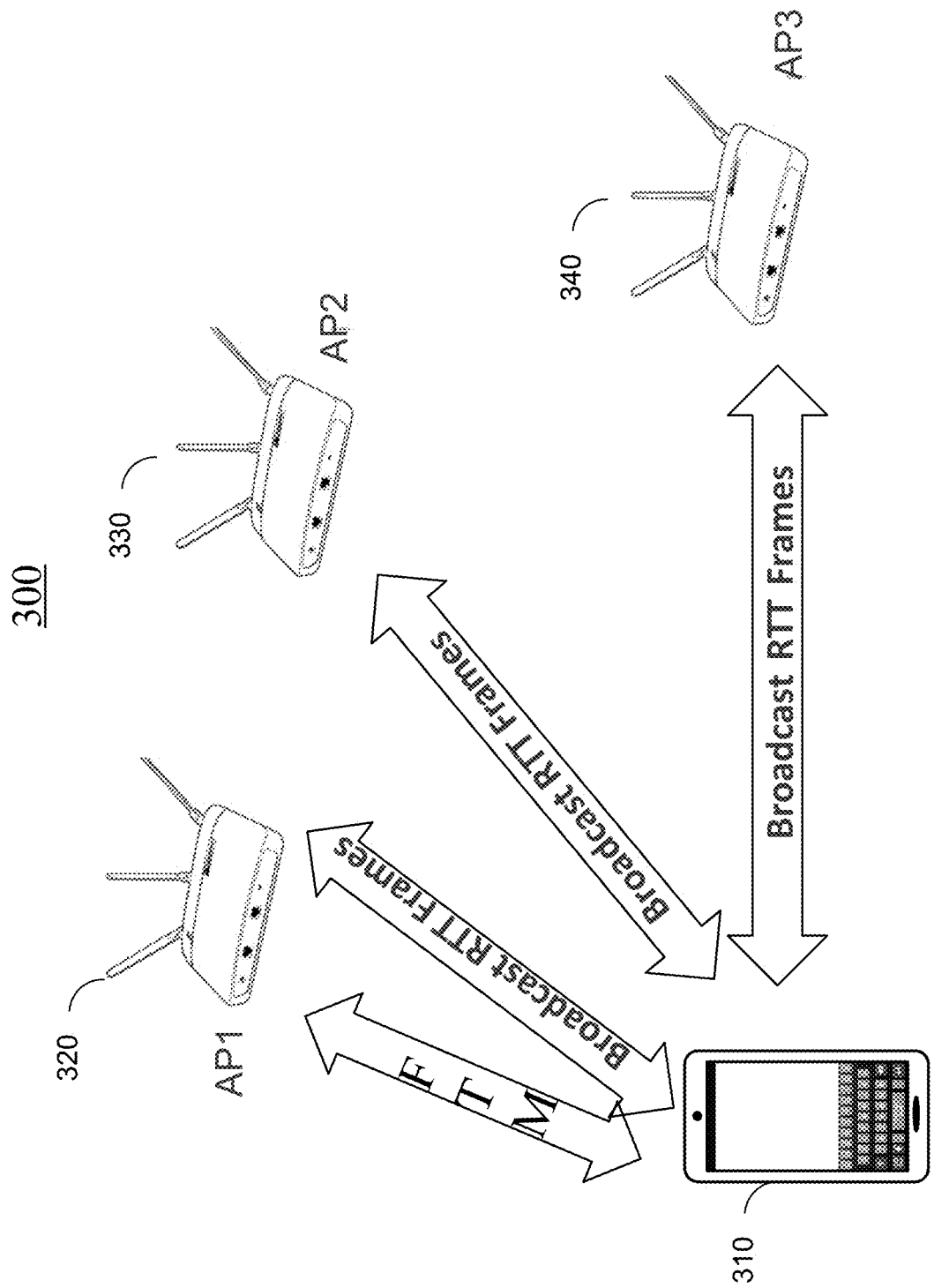
FIG. 3A illustrates a wireless communication system in which Broadcast TOD frames may be used for range measurement.

FIG. 3A illustrates a wireless communication system 300 in which Broadcast TOD frames can be used to facilitate range measurement. Wireless communication system 300 includes one or more STAs 310, and one or more APs AP1 320, AP2 330, and AP3 340 in a network of synchronized APs. For STA 310 to determine its absolute position, STA 310 may first perform an FTM session, such as FTM session 200 described above with respect to FIG. 2, with one of the synchronized neighbor APs capable of broadcasting TOD frames, for example, AP1 320. Through the FTM session, STA 310 may synchronize with AP1 320, and therefore AP2 330 and AP3 340 which are in the same network of synchronized APs as AP1 320. STA 310 may then listen to Broadcast TOD frames from neighboring APs, such as AP1 320, AP2 330, and AP3 340, to determine its range from the neighbor APs, and therefore its absolute position. STA 310 may continue to listen to Broadcast TOD frames from the neighboring APs for range measurement as it moves from one location to another.

The Broadcast TOD frames may include one or more of the TODs of the Broadcast TOD frames, estimated accuracy of the TSF timers of the broadcasting APs, location information of the broadcasting APs, or TSF offsets and/or ppm offsets between neighboring APs. The TSF offsets may exist between APs as the TSF timers of different APs may be turned on at different time instants. The ppm offsets may exist between APs as the TSF timers of different APs may have slightly different clock periods and drifts. Examples of different Broadcast TOD frame formats are described below in this disclosure.

Using the received Broadcast TOD frames, STA 310 may adjust the TODs in the received Broadcast TOD frames from the broadcasting APs based on the estimated accuracy of the timers of the broadcasting APs and/or the TSF offsets and ppm offsets of the broadcasting APs relative to the neighboring APs. The adjusted TODs of the received Broadcast TOD frames from the broadcasting APs can then be used to determine the TOF of the Broadcast TOD frames, and therefore the ranges, between the broadcasting APs and STA 310, using the TOAs of the Broadcast TOD frames at STA 310.

Figure 3B:
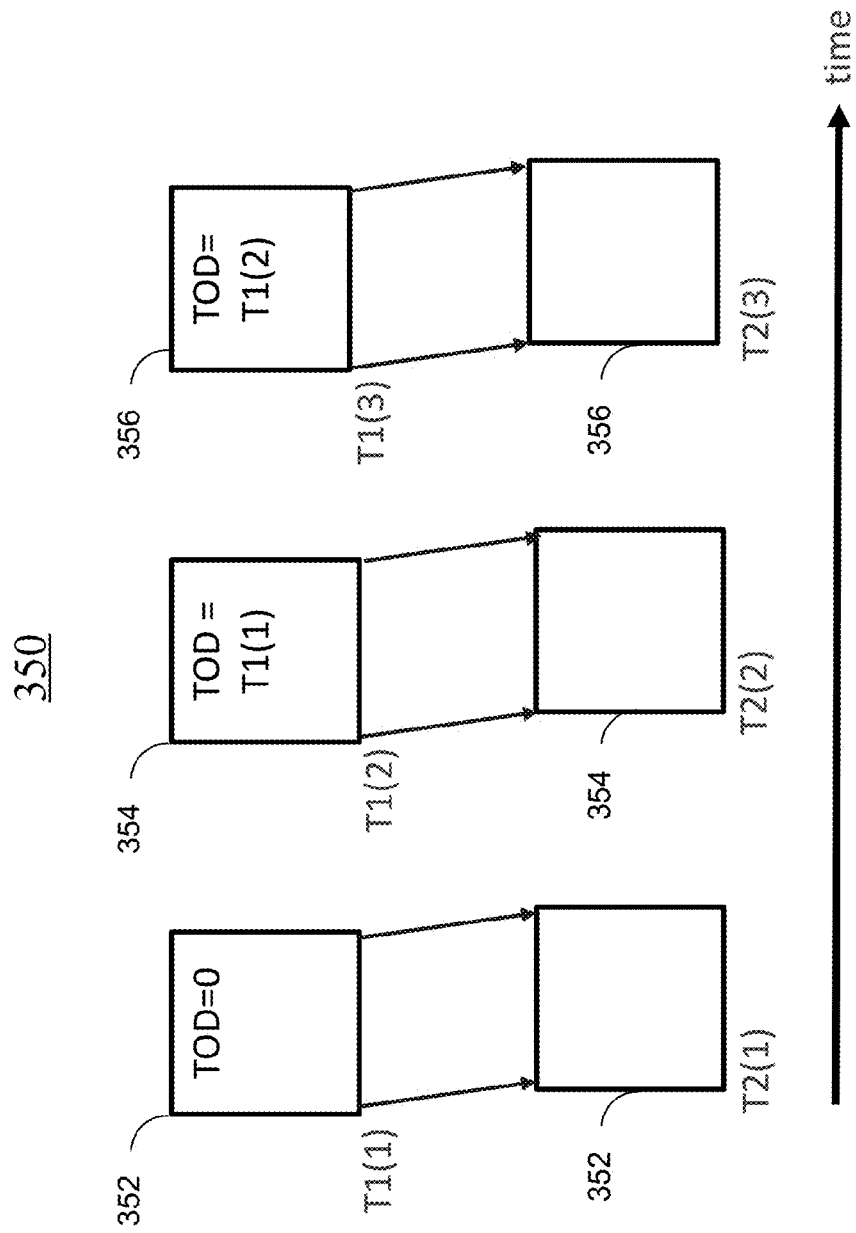
FIG. 3B is a block diagram illustrating timing measurement using Broadcast TOD frames according to one embodiment of this disclosure.

FIG. 3B is a block diagram 350 illustrating timing measurement using Broadcast TOD frames according to one embodiment of this disclosure. FIG. 3B shows three consecutive Broadcast TOD frames 352, 354, and 356 from a broadcasting AP. The Broadcast TOD frames include a TOD field including a timestamp that represents the time, with respect to a time base, at which the start of the preamble of the last transmitted Broadcast TOD frame appeared at the transmit antenna connector of the broadcasting AP. The TOD of the last transmitted Broadcast TOD frame may be set to 0 if it is the initial Broadcast TOD frame. For example, in FIG. 3B, Broadcast TOD frame 352 starts to leave the broadcasting AP at time of departure T1(1), and starts to arrive at a receiving STA at time of arrival T2(1), which represents the time, with respect to the time base or a synchronized time base, at which the start of the preamble of Broadcast TOD frame 352 arrives at the receive antenna connector of the receiving STA. In the next Broadcast TOD frame 354, the TOD field may be set to the TOD T1(1) of previous Broadcast TOD frame 352. The TOD of Broadcast TOD frame 354 from the broadcasting AP is T1(2) and the TOA of Broadcast TOD frame 354 at the receiving STA is T2(2). After receiving Broadcast TOD frame 354, the receiving STA may determine the TOF of Broadcast TOD frame 352 as T2(1)–T1(1).

In the next Broadcast TOD frame 356, the TOD field may be set to the value of TOD T1(2) of the previous Broadcast TOD frame 354. The TOD of Broadcast TOD frame 356 from the broadcasting AP is T1(3) and the TOA of Broadcast TOD frame 356 at the receiving STA is T2(3). After receiving Broadcast TOD frame 356, the receiving STA may determine the TOF of Broadcast TOD frame 354 as T2(2)–T1(2).

The receiving STA may continue to listen to Broadcast TOD frames from the broadcasting AP, determine the TOF of each Broadcast TOD frame from the broadcasting AP to the receiving STA, and, optionally, use an average TOF of multiple broadcast frames as the TOF for range measurement. The number of Broadcast TOD frames used for range measurement may vary as appropriate or desired.

Figure 3C:
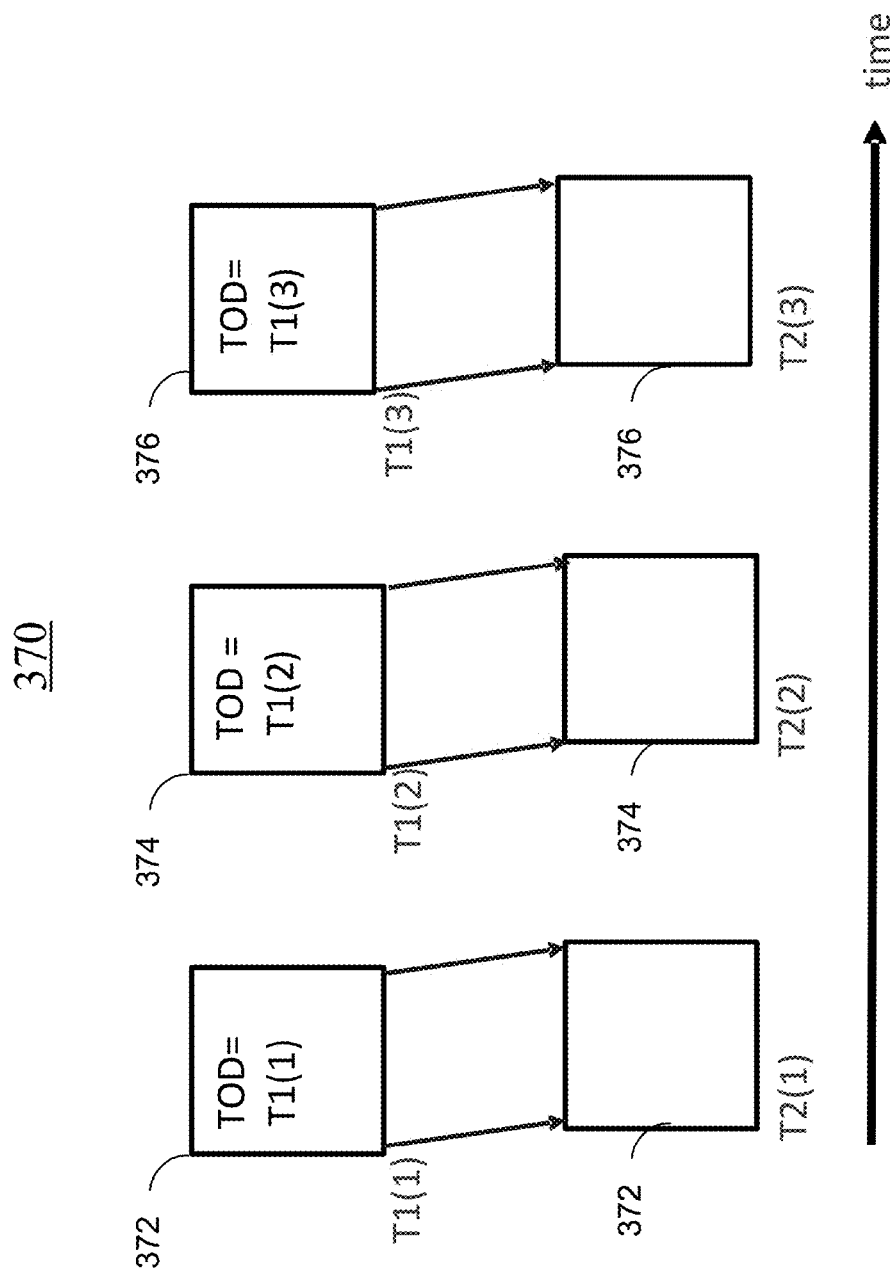
FIG. 3C is a block diagram illustrating timing measurement using Broadcast TOD frames according to an embodiment of this disclosure.

FIG. 3C is a block diagram 370 illustrating timing measurement using Broadcast TOD frames according to one embodiment of this disclosure. As shown in FIG. 3C, the TOD field in the Broadcast TOD frame may be set to the value of the TOD of the current Broadcast TOD frame from a broadcasting AP, rather than the value of the TOD of the previous Broadcast TOD frame. In such case, the TOF of the current Broadcast TOD frame can be determined once the current Broadcast TOD frame is received by a receiving STA.

FIG. 3C shows three consecutive Broadcast TOD frames 372, 374, and 376 from a broadcasting AP. The Broadcast TOD frames include a TOD field including a timestamp that represents the time, with respect to a time base, at which the start of the preamble of the currently transmitted Broadcast TOD frame appears at the transmit antenna connector of the broadcasting AP. For example, in FIG. 3C, Broadcast TOD frame 372 starts to leave the broadcasting AP at time of departure T1(1), and starts to arrive at a receiving STA at time of arrival T2(1), which represents the time, with respect to the time base or a synchronized time base, at which the start of the preamble of Broadcast TOD frame 372 arrives at the receive antenna connector of the receiving STA. After receiving Broadcast TOD frame 372, the receiving STA may determine the TOF of Broadcast TOD frame 372 as T2(1)–T1(1).

In the next Broadcast TOD frame 374, the TOD field may be set to the TOD T1(2) of current Broadcast TOD frame 374. The TOA of current Broadcast TOD frame 374 at the receiving STA is T2(2). After receiving Broadcast TOD frame 374, the receiving STA may determine the TOF of Broadcast TOD frame 374 as T2(2)–T1(2).

In the next Broadcast TOD frame 376, the TOD field may be set to the value of TOD T1(3) of the current Broadcast TOD frame 376. The TOA of current Broadcast TOD frame 376 at the receiving STA is T2(3). After receiving Broadcast TOD frame 376, the receiving STA may determine the TOF of current Broadcast TOD frame 376 as T2(3)–T1(3).

As in FIG. 3B, the receiving STA may continue to listen to Broadcast TOD frames from the broadcasting AP, determine the TOF of each Broadcast TOD frame from the broadcasting AP to the receiving STA, and, optionally, use an average TOF of multiple broadcast frames as the TOF for range measurement. The number of Broadcast TOD frames used for range measurement may vary as appropriate or desired.

IV. Examples of Broadcast TOD Frame Format

Broadcast TOD frames may take different formats, and may include different information that can enable a receiving STA to perform range measurement. The following section provides several example formats of Broadcast TOD frames. A person of ordinary skill in the art will recognize many variations on the embodiments illustrated. For example, the order of various fields in a Broadcast TOD frame may be changed. Some fields may be optional, and may be present if, for example, a better accuracy is desired. In some embodiments, additional field(s) may be added to the Broadcast TOD frame formats described below. In some embodiments, some fields may be omitted.

FIG. 4A illustrates a Broadcast TOD frame 400 according to some embodiments of the present disclosure. Broadcast TOD frame 400 includes a TOD TSF Timestamp field, a TOD of Previous Beacon field, a Format and Bandwidth (BW) field, a ppm Estimate field, a Transmit Power field, a Neighbor Report field, a location configuration information (LCI) Report field, and a Vendor Specific field. Some fields, such as the ppm Estimate field and the Neighbor Report field, may be optional in some implementations.

The TOD TSF Timestamp field represents the value of the TSF timer of the frame's source—the broadcasting AP. When an STA or AP transmits the announce frame, probe response, beacon frame, or Broadcast TOD frame, the TSF Timestamp field can be set to the value of the STA's or the AP's TSF timer at the time when the data symbol containing the first bit of the TSF Timestamp field is transmitted to the physical layer (PHY) plus the transmitting STA's or AP's delay through its local PHY from the medium access control-physical layer (MAC-PHY) interface to its interface with the wireless medium (WM), such as an antenna.

The Broadcast TOD frame may be different from the announce frame, probe response, or beacon frame in TSF timestamp accuracy. For example, the TOD TSF Timestamp in the Broadcast TOD frame may be in units of picoseconds and wrap around every 213.5 days.

The TOD of Previous Beacon field includes a timestamp that represents the time, with respect to a time base, at which the start of the preamble of the last transmitted Broadcast TOD frame appeared at the transmit antenna connector. The value in the TOD of Previous Beacon field may be, for example, in units of picoseconds. The TOD of Previous Beacon field may be, for example, 6-octet long. If the Broadcast TOD frame is the first Broadcast TOD frame, the TOD of Previous Beacon field may be set to 0. The value in the TOD of Previous Beacon field may be used by a receiving STA to determine a TOF of the previous Broadcast TOD frame as described above with respect to FIG. 3B.

The Format and BW field in Broadcast TOD frame 400 indicates the allocated packet format and Bandwidth used by the Broadcast TOD frames. The Format and BW field may be 1-byte long. The definition of field values and the corresponding formats and bandwidths may be the same as the definition of the FTM Format and Bandwidth field in an FTM frame as specified in IEEE 802.11REVmc. For example, a "0" in the Format and BW field indicates no preference by the initiating STA and that this field is not used by the responding STA. The format may be one of non-high throughput (non-HT) PHY specification, high throughput (HT) PHY specification, HT mixed PHY specification, or very high throughput (VHT) PHY specification. The bandwidth may be one of 5 MHz, 10 MHz, 20 MHz, 40 MHz, 80 MHz, or 160 MHz.

The ppm Estimate field indicates the estimated accuracy of the TSF timer (or TOD) value for the current Broadcast TOD frame in parts-per-million (ppm). This field may be optional.

The Transmit Power field indicates the transmit power of current Broadcast TOD frame. The value of the Transmit Power field is no greater than the max transmit power allowed, and indicates the actual power used as measured at the output of the antenna connector, in decibel-milliwatts (dBm), by an STA or AP when transmitting the Broadcast TOD frame. The value in the Transmit Power field may represent the transmit power in units of, for example, 0.25 dBm. For example, a 10 in the Transmit Power field may indicate that the transmit power of the current frame is 2.5 dBm. The Transmit Power field may be represented by a 2's-complement signed integer and is 1-octet long. The transmit power may be determined prior to sending the Broadcast TOD frame and may have a tolerance of, for example, about ±5 dB.

The Neighbor Report field may include a plurality of Neighbor Report elements, each for one of a plurality of neighbor APs. Each Neighbor Report element describes a neighbor AP and may include basic service set identifiers (BSSID), BSSID Information, Channel Number, Operating Class, PHY Type, and optionally Optional Subelements, as defined in Neighbor Report element format in IEEE 802.11REVmc. The Optional Subelements field may include a TSF offset value and/or a ppm offset value between TSF timers of two neighbor APs. In many situations, the TSF offset and/or ppm offset values may be more accurate and robust than the value in the ppm Estimate field as it is difficult to obtain an accurate estimation of a TSF timer without using a reference timer. A receiving STA may use the TSF offset and/or the ppm offset between neighbor APs to more accurately adjust the timing difference/offset of the timer of a broadcasting AP relative to the timer of the receiving STA. The Neighbor Report element may also include the location configuration information (LCI) Report of each neighbor AP as described below. Various examples of Neighbor Report field are provided below with respect to FIGS. 7A-8C.

The LCI Report field may include latitude, longitude, altitude, and related information of the broadcasting AP, as defined in IEEE 802.11REVmc. For example, the LCI Report field may include latitude uncertainty, latitude, longitude uncertainty, longitude, altitude type, altitude uncertainty, and altitude, which may be defined based on the LCI format described in Internet Engineering Task Force (IETF) Request for Comments (RFC) 6225 for encoding the coordinates of an AP in order to define the location of the AP. Based on the LCI report of one or more APs, a receiving STA may determine its own absolute position using its ranges to the one or more APs.

The Vendor Specific field may be used to carry information not defined within a single defined format in a standard. For example, the Vendor Specific field may include an organization identifier and vendor-specific content defined by the specific vendor.

FIG. 4B illustrates a variation 450 of Broadcast TOD frame 400 of FIG. 4A, according to some embodiments of the present disclosure. Broadcast TOD frame 450 includes a TOD TSF Timestamp field, a Fractional TSF Timestamp, a Format and Bandwidth (BW) field, an optional ppm Estimate field, a Transmit Power field, an optional Neighbor Report field, a location configuration information (LCI) Report field, and a Vendor Specific field. Some fields, such as the ppm Estimate field and the Neighbor Report field, may be optional in some implementations.

Broadcast TOD frame 450 replaces the TOD of the Previous Beacon field in Broadcast TOD frame 400 with the Fractional TSF Timestamp field. The value in the Fractional TSF Timestamp field indicates a fraction portion of the TSF timestamp, and may be more accurate, for example, in units of picoseconds or less, than values in the TSF Timestamp field in an FTM frame, which may be in units of microseconds.

FIG. 5A illustrates a Broadcast TOD frame 500 according to some embodiments of the present disclosure. Broadcast TOD frame 500 includes a TOD TSF Timestamp field, a TOD of Previous Beacon field, a Format and BW field, an optional ppm Estimate field, a Transmit Power field, an optional Neighbor Report field, and a Vendor Specific field. Some fields, such as the ppm Estimate field and the Neighbor Report field, may be optional in some implementations. The TOD TSF Timestamp field, TOD of Previous Beacon field, Format and BW field, ppm Estimate field, Transmit Power field, and Vendor Specific field in Broadcast TOD frame 500 may be similar to the corresponding fields in Broadcast TOD frame 400.

The Neighbor Report field in Broadcast TOD frame 500 may be different from the Neighbor Report field in Broadcast TOD frame 400, and may include Neighbor Report element of the broadcasting AP itself. Each Neighbor Report element may include an LCI Report of an AP (including the broadcasting AP), and the TSF offset and/or ppm offset between a TSF timer of a neighbor AP and the AP that broadcasts the current Broadcast TOD frame. The Neighbor Report element for the AP that broadcasts the current Broadcast TOD frame may include a ppm estimate rather than a ppm offset as the timer ppm offset between the AP that broadcasts the current Broadcast TOD frame and itself is 0.

FIG. 5B illustrates a variation 550 of Broadcast TOD frame 500 of FIG. 5A, according to some embodiments of the present disclosure. Broadcast TOD frame 550 includes a TOD TSF Timestamp field, a Format and BW field, an optional ppm Estimate field, a Transmit Power field, an optional Neighbor Report field, and a Vendor Specific field, as described above with respect to Broadcast TOD frame 500. Broadcast TOD frame 550 replaces the TOD of Previous Beacon field in Broadcast TOD frame 500 with a Fractional TSF Timestamp field. The value in the Fractional TSF Timestamp field indicates a fraction portion of the TSF timestamp, and may be more accurate, for example, in units of picoseconds or less, than values in the TSF timestamp field in an FTM frame, which may be in units of microseconds.

In some cases, the Neighbor Report field may be long when Neighbor Report elements for a plurality of neighbor APs are included. Thus, an absolute time drift may be large during the transmission of the Broadcast TOD frame. Therefore, in some embodiments, a short version of Broadcast TOD frame without the Neighbor Report field may be used.

FIG. 6A illustrates a Broadcast TOD frame 600 according to some embodiments of the present disclosure. As in Broadcast TOD frame 500, Broadcast TOD frame 600 may include a TOD TSF Timestamp field, a TOD of Previous Beacon field, a Format and BW field, an optional ppm Estimate field, a Transmit Power field, and a Vendor Specific field. Broadcast TOD frame 600 does not include a Neighbor Report field, but includes an optional fully qualified domain name (FQDN) field. The FQDN field may point to a location server and can be used by a receiving STA to locate the location server and establish communications with it. The protocol used by the location server may be indicated by an FQDN descriptor. A receiving STA may use the FQDN information to obtain information about a broadcasting AP, such as the Neighbor Report of the broadcasting AP, LCI Report, or TSF offset and/or ppm offset between the broadcasting AP and neighbor APs, as described above with respect to Broadcast TOD frame 400 of FIG. 4A.

FIG. 6B illustrates a variation 650 of Broadcast TOD frame 600, according to some embodiments of the present disclosure. Broadcast TOD frame 650 includes a TOD TSF Timestamp field, a Format and BW field, an optional ppm Estimate field, a Transmit Power field, an optional FQDN field, and a Vendor Specific field, as described above with respect to Broadcast TOD frame 600. Broadcast TOD frame 650 replaces the TOD of Previous Beacon field in Broadcast TOD frame 600 with a Fractional TSF Timestamp field. The value in the Fractional TSF Timestamp field indicates a fraction portion of the TSF timestamp, and may be more accurate, for example, in units of picosecond or less, than values in the TSF timestamp field in an FTM frame, which may be in units of microseconds.

In some embodiments, a broadcasting AP may be configured to transmit Broadcast TOD frames of different formats. For example, the broadcasting AP may transmit the Broadcast TOD frames in groups, where one Broadcast TOD frame in each group may be a long frame that includes optional information such as ppm Estimate and Neighbor Report that includes the TSF Offset and ppm Offset, and other frames in the group may be short frames that do not include any optional fields.

V. Neighbor Report Examples

As described above, the Neighbor Report field in a Broadcast TOD frame may take different formats as appropriate or as needed. FIGS. 7A-8C illustrates various examples of Neighbor Report field according to various embodiments of this disclosure.

FIG. 7A illustrates a Neighbor Report element 700 in the Neighbor Report field of a Broadcast TOD frame. As the Neighbor Report field defined in IEEE 802.11REVmc, the Neighbor Report field in a Broadcast TOD frame may include a plurality of Neighbor Report elements, each for one of a plurality of neighbor APs. As shown in FIG. 7A, each Neighbor Report element may describe an AP and may include Element ID, Length, BSSID, BSSID Information, Operating Class, Channel Number, PHY Type, and optionally, Optional Subelements fields.

The Element ID filed identifies the type of a Neighbor Report element by a pre-defined number. The Length field specifies the number of octets following the Length field. The BSSID is the BSSID of the BSS being reported. The subsequent fields in the Neighbor Report element pertain to this BSS. The BSSID Information field may be used to determine neighbor service set transition candidates. The Operating Class field indicates the channel set of the AP indicated by this BSSID. The Channel Number field indicates the last known primary channel of the AP indicated by this BSSID. The Channel Number is defined within an operating class. The Operating Class and Channel Number fields together specify the channel frequency and spacing for the channel on which the Broadcast TOD frames are being transmitted for the BSS being reported. The PHY Type field indicates the PHY type of the AP indicated by this BSSID. The Optional Subelements field includes zero or more subelements.

FIG. 7B is a table 750 illustrating examples of various optional subelements in a Neighbor Report element of the Neighbor Report field in a Broadcast TOD frame. Each optional subelement may be defined to have a common general format including a 1-octet element-specific Subelement ID field, a 1-octet Length field, and a variable-length subelement-specific Data field. For example, subelement ID "1" may be used for the TSF subelement. Some subelement IDs, such as 0, 7-38, and 40-44, may be reserved for future extension or other purposes. Additional neighbor report information disclosed herein may be included in an existing subelement or a reserved subelement as described below in various examples with respect to FIGS. 8A-8C. A person of ordinary skill in the art will recognize many variations on the examples illustrated.

FIG. 8A illustrates a subelement 800 in a Neighbor Report element of a Neighbor Report field in a Broadcast TOD frame, according to some embodiments of the present disclosure. Subelement 800 may include additional information of a neighbor AP appended to an existing subelement, such as the TSF subelement with the subelement ID of "1" as shown in FIG. 7B.

As shown in FIG. 8A, subelement 800 may include a Subelement ID field, a Length field, a TSF Offset field, and a Beacon Interval field as in the TSF subelement defined in IEEE 802.11REVmc. The Subelement ID field may be "1" as defined in FIG. 7B. The Length field specifies the number of octets in the subelement-specific Data field, which includes the TSF Offset subfield, the Beacon Interval subfield, and any additional subfields. The TSF Offset subfield shown in FIG. 8A is 2-octet long and includes a neighbor AP's TSF timer offset, which is the time difference between the TSF timer of the AP that broadcasts the current TOD frame and the TSF timer of a neighbor AP. The TSF offset may be given as the time difference modulo the neighbor AP's Beacon Interval, and rounded to the nearest time unit boundary. The Beacon Interval field indicates the duration of the beacon interval of the Neighbor AP indicated by the BSSID.

The Data field of subelement 800 may include additional information of Fractional TSF Offset (TSF Offset Frac) and ppm Offset between the AP that broadcasts the current TOD frame and a neighbor AP. The TSF Offset Frac field may include the fractional portion of the TSF offset before it is rounded to the nearest time unit boundary. For example, the TSF Offset field may be in units of microseconds, while the TSF Offset Frac field may be in units of picoseconds or smaller. The TSF Offset Frac field may be 3-octet long. TSF Offset Frac values above 100,000 may be reserved. The ppm Offset field may be signed or unsigned, and may range from, for example, −328 ppm to 328 ppm, in units of 0.1 ppm. The ppm Offset field may be 2-octet long.

FIG. 8B illustrates a subelement 820 in a Neighbor Report element of the Neighbor Report field in a Broadcast TOD frame according to some embodiments of the present disclosure. Subelement 820 may use one of the reserved subelement IDs shown in FIG. 7B. The Data field of subelement 820 may include a TSF Offset Frac field and a ppm Offset field, as described above with respect to FIG. 8A.

FIG. 8C illustrates a subelement 840 in a Neighbor Report element of the Neighbor Report field in a Broadcast TOD frame according to some embodiments of the present disclosure. Subelement 840 may use one of the reserved subelement IDs shown in FIG. 7B. The Data field of subelement 840 may include a ppm Offset field, as described above with respect to FIG. 8A, and a TOD TSF Offset field rather than a TSF Offset Frac field. The TOD TSF Offset field may include the offset between the TOD TSF timestamp of the AP that broadcasts the current TOD frame and the TOD TSF timestamp of a neighbor AP. The TOD TSF Offset field may be in units of picoseconds or smaller.

VI. Effect of Clock Drift on Timestamps

Due to slow drift of the timer in an AP or STA, timing errors may occur in the timestamps for TOD and/or TOA. For example, if Broadcast TOD frames are transmitted every X seconds, the timing error of the timestamp in the Broadcast TOD frames may be X×0.5 ms if the ppm estimate of the TSF timer is 500 ppm, and X×50 μs if the ppm estimate of the TSF timer is 50 ppm. To minimize the effect of clock drift on the accuracy of the timestamps, a group of Broadcast TOD frames may be transmitted together. In some embodiments, the first Broadcast TOD frame may have all the necessary information, such as the Neighbor Report and ppm Estimate fields, and subsequent Broadcast TOD frames may be "short" and do not have the Neighbor Report and ppm Estimate fields. If a short Broadcast TOD frame having 12 bytes of information is 28 μs long and the gap between consecutive Broadcast TOD frames is 16 us, i.e., the Broadcast TOD frames are transmitted every 44 μs, the clock drift is 22 ns and 2.2 ns for a ppm estimate of 500 and 50 ppm, respectively. In some embodiments, to remove the effect of PHY preamble overhead, a non-HT Duplicate frame format as defined in IEEE 802.11REVmc may be used.

Reducing the Broadcast TOD frame size may help to reduce the effect of clock drift on the accuracy of the TSF timestamps, but further error reduction may be desired in some situations. For example, to achieve 0.5 ns (15 cm) or less ranging error, a ppm offset of 11 ppm for the timer of the broadcasting AP may be desired even if short interval frame spacing (SIFS) bursting of Broadcast TOD frame is used since $11\ e^{-6} \times 44\ \mu s = 0.5$ ns.

The following section provides methods for mitigating the effect of clock drift on the accuracy of timestamps in the Broadcast TOD frames.

In a perfectly synchronized system without drift, the relationship between actual TOD T1(m) and actual TOA T2(m) may be described as:

$$T2(m) = T1(m) + TOF. \quad (1)$$

Assume that the drift rate $\alpha_{AP}$ of the TSF timer of an AP is known, the drift rate of the TSF timer of an STA is $\alpha_{STA}$; the captured timestamp of the TOD from the AP for the $m^{th}$ Broadcast TOD frame is T1'(m), the captured timestamp of the TOA at the STA for the $m^{th}$ Broadcast TOD frame is T2'(m), and T2'(1)=T2(1) and T1'(1)=T1(1) (i.e., no drift in the first timestamp). The captured timestamps may be described as:

$$T2'(m) = T2(m) + (T2(m) - T2'(1))\alpha_{STA} = T2(m)(1+\alpha_{STA}) - T2'(1)\alpha_{STA} \quad (2)$$

and $$T1'(m) = T1(m) + (T1(m) - T1'(1))\alpha_{AP} = T1(m)(1+\alpha_{AP}) - T1'(1)\alpha_{AP}. \quad (3)$$

Thus, the actual TOF can be calculated from $$T2(m) - T1(m) = \frac{T2'(m) + T2'(1)\alpha_{STA}}{(1+\alpha_{STA})} - \frac{T1'(m) + T1'(1)\alpha_{AP}}{(1+\alpha_{AP})}, \quad (4)$$

and an average actual TOF can be calculated using the following equation:

$$TOF = \frac{1}{N}\sum_{k=1}^{N} T2(k) - T1(k). \quad (5)$$

If the drift rate $\alpha_{STA}$ of the TSF timer of an STA is unknown, $\alpha_{STA}$ may be calculated by, for example, setting T2(2)−T1(2)=T2(3)−T1(3), because it is unlikely that the STA would move much between two consecutive Broadcast TOD frames, and thus the actual TOF between the STA and the AP should remain almost unchanged during two consecutive Broadcast TOD frames, such that:

$$\frac{T2'(2) + T2'(1)\alpha_{STA}}{(1+\alpha_{STA})} - \frac{T1'(2) + T1'(1)\alpha_{AP}}{(1+\alpha_{AP})} = \frac{T2'(3) + T2'(1)\alpha_{STA}}{(1+\alpha_{STA})} - \frac{T1'(3) + T1'(1)\alpha_{AP}}{(1+\alpha_{AP})}, \quad (6)$$

which yields $$(T1'(3) - T1'(2))\alpha_{STA} = -(1+\alpha_{AP})T2'(2) + T1'(2) + T2'(3)$$
$$(1+\alpha_{AP}) - T1'(3). \quad (7)$$

Thus, the clock drift rate of the timer on the STA can be calculated by $$\alpha_{STA} = \frac{(1+\alpha_{AP})(T2'(3) - T2'(2))}{T1'(3) - T1'(2)} - 1. \quad (8)$$

The above method can also be used by APs to determine their ppm offsets with respect to their neighbor APs.

VII. Example Methods

Figure 9A:
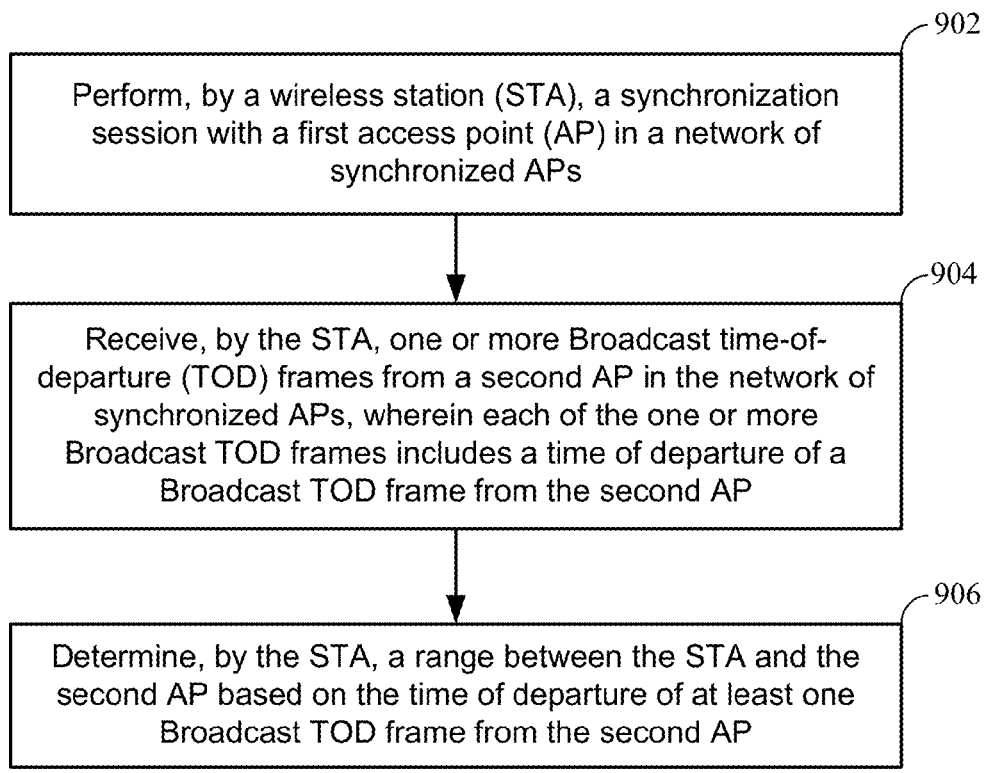
FIG. 9A is a flow chart illustrating an embodiment of a method of using broadcasting Broadcast TOD frames for range and/or position determination by a wireless station.

FIG. 9A is a flow chart 900 illustrating an embodiment of a method of using broadcasting Broadcast TOD frames for range and/or position determination by a wireless station.

Figure 10:
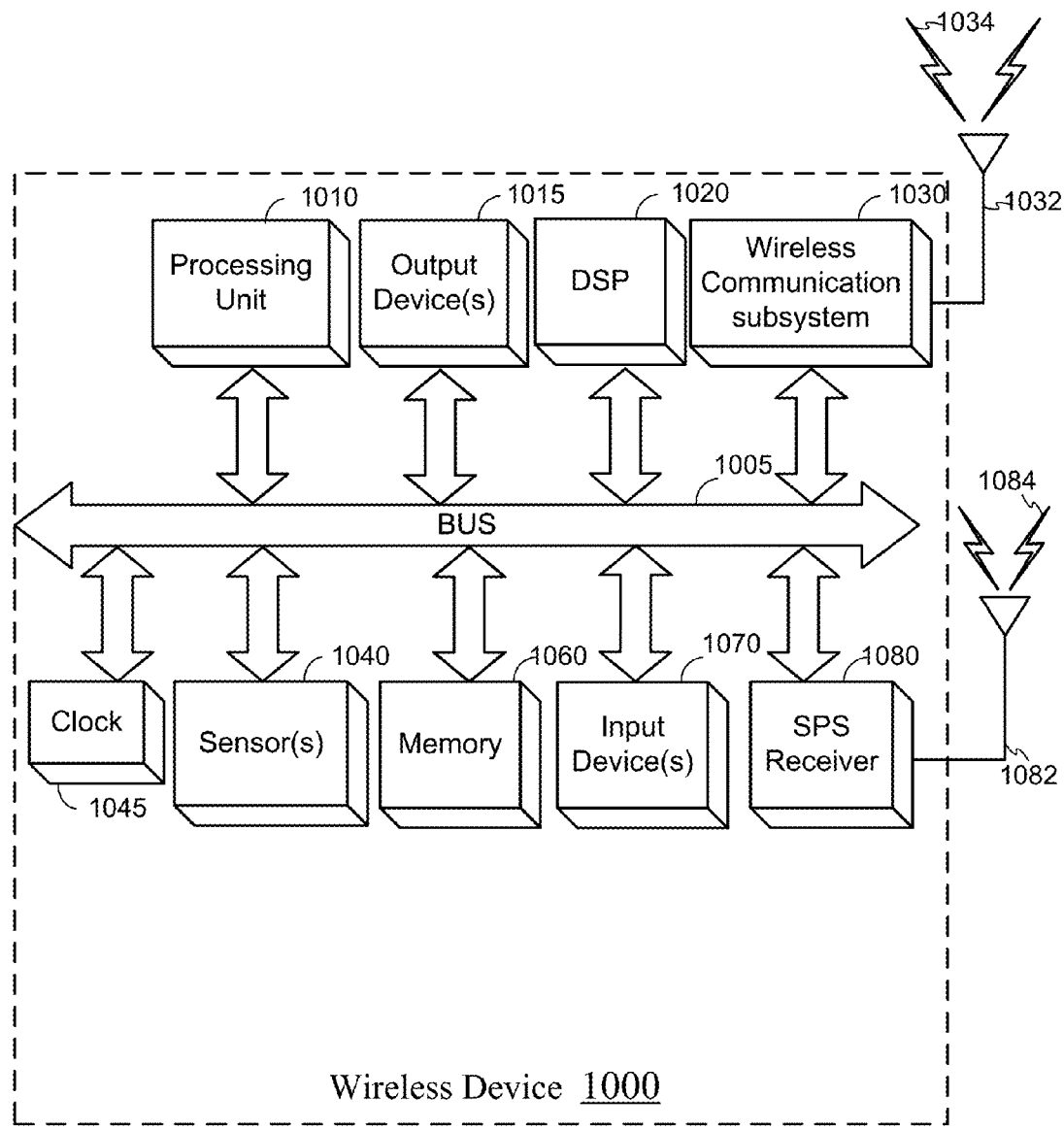
FIG. 10 is a block diagram of an embodiment of a wireless device.
Figure 11:
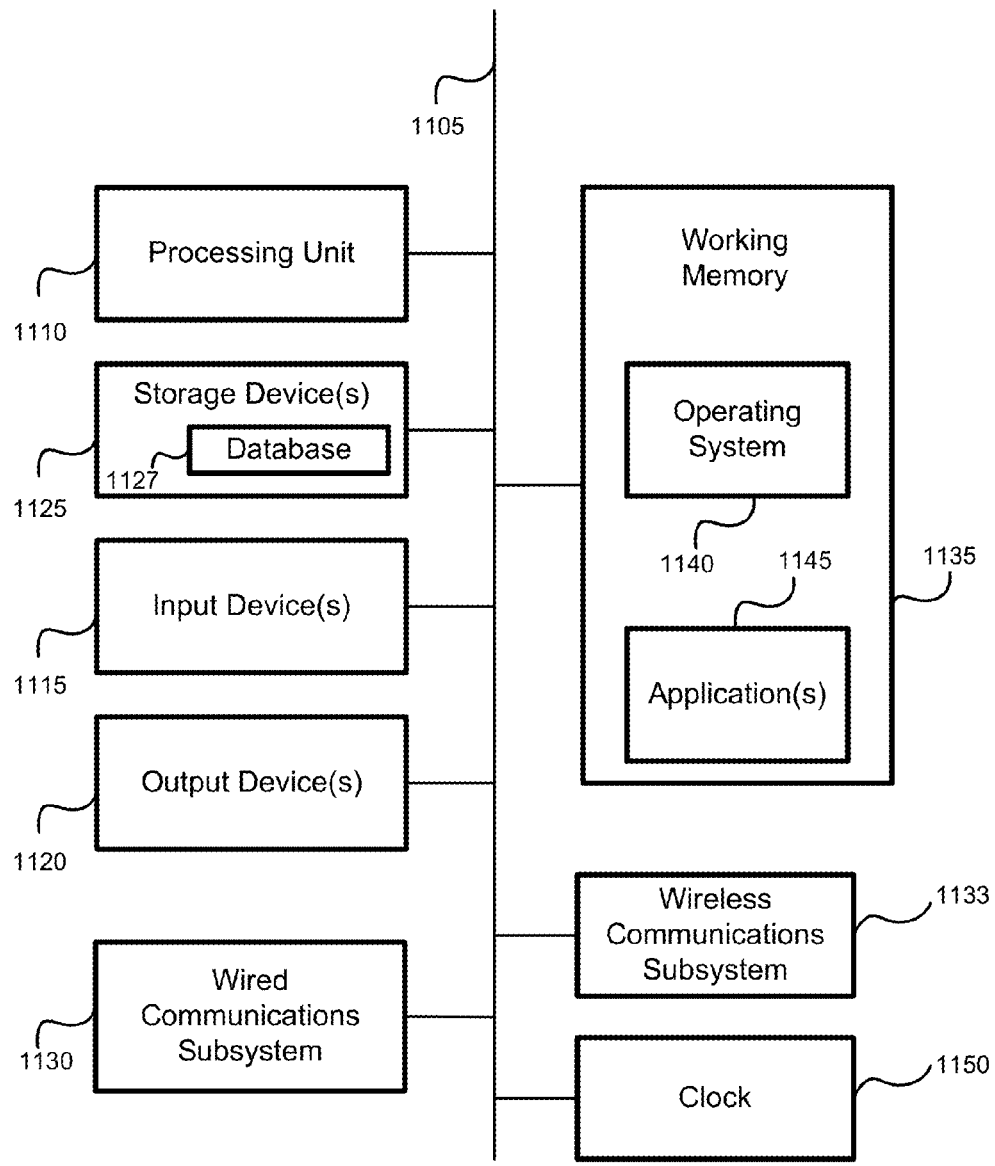
FIG. 11 is a block diagram of an embodiment of a computing device.

At block 902, an STA, such as STA 310 in FIG. 3A, may first perform a synchronization session with a first AP in a network of synchronized APs, such as AP1 320, AP2 330, or AP3 340 of FIG. 3A. The synchronization session may be an FTM session, such as FTM session 200 described above with respect to FIG. 2. Through the FTM session, STA 310 may synchronize with AP1 320, AP2 330, or AP3 340, and therefore other APs that are synchronized with AP1 320, AP2 330, or AP3 340. In some embodiments, STA 310 may determine its range or distance from AP1 320, AP2 330, or AP3 340 through the FTM session. In some embodiments, means for performing the function at block 902 may include, but are not limited to, for example, wireless communication subsystem 1030, processing unit 1010, memory 1060, clock 1045, and/or bus 1005 as illustrated in FIG. 10 and described in detail below. In some embodiments, means for performing the function at block 902 may include, but are not limited to, for example, wireless communications subsystem 1133, processing unit 1110, working memory 1135, clock 1150, and/or bus 1105 as illustrated in FIG. 11 and described in detail below.

At block 904, the STA, such as STA 310 of FIG. 3A, may receive one or more Broadcast TOD frames from a second AP, such as AP1 320, in the network of synchronized APs. Each of the one or more Broadcast TOD frames may include a time of departure of a Broadcast TOD frame from the second AP, and optionally, information regarding an accuracy of a timer of the second AP. The Broadcast TOD frames may also include one or more of the location information of the second AP, and the TSF offset and/or ppm offset between the second AP and one or more other APs that are synchronized with the second AP in the network of synchronized APs. The format of each Broadcast TOD frame may be any one of the examples described above with respect to FIGS. 4A-6B, or any appropriate variation thereof. The Neighbor Report field, if used, may be similar to any one of the examples described above with respect to FIGS. 7A-8C, or any variation thereof. In embodiments in which STA 310 may determine its range from the second AP AP1 320, in addition to timing synchronization, through the FTM session, block 904 may be optional. In some embodiments, the first AP and the second AP may be a same AP. In some embodiments, the first AP and the second AP may be different APs. In some embodiments, means for performing the function at block 904 may include, but are not limited to, for example, wireless communication subsystem 1030, processing unit 1010, memory 1060, and/or bus 1005 as illustrated in FIG. 10 and described in detail below. In some embodiments, means for performing the function at block 904 may include, but are not limited to, for example, wireless communications subsystem 1133, processing unit 1110, working memory 1135, and/or bus 1105 as illustrated in FIG. 11 and described in detail below.

At block 906, based on the received time of departure of at least one Broadcast TOD frame from the second AP AP1 320, and optionally, the information regarding the accuracy of the timer of the second AP AP1 320, STA 310 may determine a time of flight of the at least one Broadcast TOD frame from AP1 320 to STA 310, using a time of arrival of the at least one Broadcast TOD frame at STA 310, and then determine a range between STA 310 and the second AP AP1 320. In some embodiments, STA 310 may also adjust the received TOD from the second AP AP1 based on the information regarding the accuracy of the timer of the second AP AP1 320, and/or the TSF offset and ppm offset of the second AP AP1 320 relative to other APs in the network of synchronized APs in the received Broadcast TOD frames. The adjusted TOD for the second AP AP1 320 may then be used to determine the time of flight of the Broadcast TOD frames, and therefore the range, from the second AP AP1 320 to STA 310, using the TOA of the Broadcast TOD frames at STA 310. In embodiments in which STA 310 may determine its range from the second AP AP1 320, in addition to timing synchronization, through the FTM session, block 906 may be optional. In some embodiments, means for performing the function at block 906 may include, but are not limited to, for example, processing unit 1010, memory 1060, clock 1045, and/or bus 1005 as illustrated in FIG. 10 and described in detail below. In some embodiments, means for performing the function at block 906 may include, but are not limited to, for example, processing unit 1110, working memory 1135, clock 1150, and/or bus 1105 as illustrated in FIG. 11 and described in detail below.

Figure 9B:
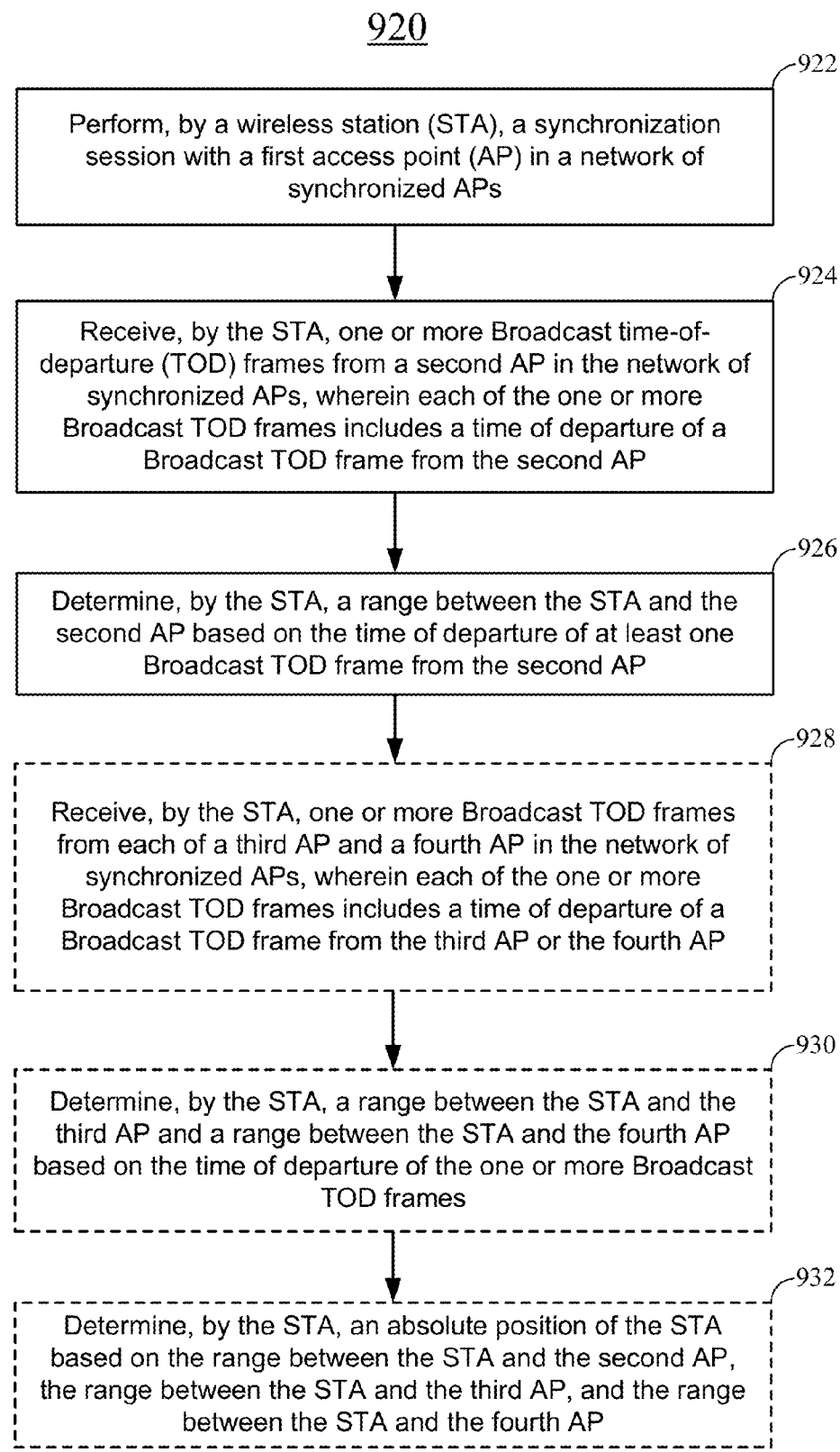
FIG. 9B is a flow chart illustrating another embodiment of a method of using broadcasting Broadcast TOD frames for range and/or position determination by a wireless station.

FIG. 9B is a flow chart 920 illustrating another embodiment of a method of using broadcasting Broadcast TOD frames for range and/or position determination by a wireless station.

At block 922, an STA may perform a synchronization session with a first AP in a network of synchronized APs as described above with respect to block 902 of FIG. 9A. At block 924, the STA may receive one or more Broadcast TOD frames from a second AP in the network of synchronized APs as described above with respect to block 904 of FIG. 9A. Each of the one or more Broadcast TOD frames may include a time of departure of a Broadcast TOD frame from the second AP. At block 926, the STA may determine a range between the STA and the second AP based on the time of departure of at least one Broadcast TOD frame from the second AP as described above with respect to block 906 of FIG. 9A.

At block 928, optionally, STA 310 may receive one or more Broadcast TOD frames from each of a third AP and a fourth AP in the network of synchronized APs, such as AP2 330 and AP3 340. Each of the one or more Broadcast TOD frames may include a time of departure of a Broadcast TOD frame from the third AP, such as AP2 330, or the fourth AP, such as AP3 340, and, optionally, information regarding an accuracy of a timer of the third AP AP2 330 or the fourth AP AP3 340. The Broadcast TOD frames may also include one or more of the location information of the third AP or the fourth AP, and the TSF offset and/or ppm offset between the third AP or the fourth AP and one or more other APs that are synchronized with the third and the fourth APs. The format of each Broadcast TOD frame may be any one of the examples described above with respect to FIGS. 4A-6B, or any appropriate variation thereof. The Neighbor Report field, if used, may be similar to any one of the examples described above with respect to FIGS. 7A-8C, or any variation thereof. In some embodiments, means for performing the function at block 928 may include, but are not limited to, for example, wireless communication subsystem 1030, processing unit 1010, memory 1060, and/or bus 1005 as illustrated in FIG. 10 and described in detail below. In some embodiments, means for performing the function at block 928 may include, but are not limited to, for example, wireless communications subsystem 1133, processing unit 1110, working memory 1135, and/or bus 1105 as illustrated in FIG. 11 and described in detail below.

At block 930, optionally, based on the received time of departure of the one or more Broadcast TOD frames from the third AP AP2 330 and the fourth AP AP3 340, and, optionally, the information regarding the accuracy of the timer of the third AP AP2 330 and the fourth AP AP3 340, STA 310 may determine a time of flight of each of the one or more Broadcast TOD frames from AP2 330 or AP3 340 to STA 310, using a time of arrival of each of the one or more Broadcast TOD frames at STA 310, and then determine a range between STA 310 and each of the third AP AP2 330 and the fourth AP AP3 340. In some embodiments, STA 310 may also adjust the received TOD from the third AP AP2 330 and the fourth AP AP3 340 based on the information regarding the accuracy of the timer of the third AP AP2 330 and the fourth AP AP3 340, and/or the TSF offset and ppm offset of the third AP AP2 330 and the fourth AP AP3 340 relative to other APs in the network of synchronized APs in the received Broadcast TOD frames. The adjusted TOD for the third AP AP2 330 and the fourth AP AP3 340 can then be used to determine the time of flight of the Broadcast TOD frames, and therefore the range, between the broadcasting APs and STA 310, using the TOA of the Broadcast TOD frames at STA 310. In some embodiments, means for performing the function at block 930 may include, but are not limited to, for example, processing unit 1010, memory 1060, clock 1045, and/or bus 1005 as illustrated in FIG. 10 and described in detail below. In some embodiments, means for performing the function at block 930 may include, but are not limited to, for example, processing unit 1110, working memory 1135, clock 1150, and/or bus 1105 as illustrated in FIG. 11 and described in detail below.

At block 932, optionally, STA 310 may determine an absolute position of itself based on the ranges between STA 310 and the second AP AP1 320, the third AP AP2 330 and the fourth AP AP3 340. The determination of the absolute position of STA 310 may also be based on location information of each of broadcasting APs, such as AP1 320, AP2 330, and AP3 340. The location information may be obtained through the Broadcast TOD frames or an FQDN server identified in the Broadcast TOD frames. In some embodiments, means for performing the function at block 932 may include, but are not limited to, for example, processing unit 1010, memory 1060, and/or bus 1005 as illustrated in FIG. 10 and described in detail below. In some embodiments, means for performing the function at block 932 may include, but are not limited to, for example, processing unit 1110, working memory 1135, and/or bus 1105 as illustrated in FIG. 11 and described in detail below.

As described above with respect to FIGS. 3B and 3C, the TOD value in the Broadcast TOD frames may be the TOD value of the previous Broadcast TOD frame or the current Broadcast TOD frame at the broadcasting AP.

It is noted that even though FIGS. 9A and 9B describe the operations as a sequential process, many of the operations can be performed in parallel or concurrently. In addition, the order of the operations may be rearranged. An operation may have additional steps not included in the figure. Some operations may be optional, and thus may be omitted in various embodiments. Some operations described in one block may be performed together with operations at another block. For example, operations in block 924 and block 928 of FIG. 9B may be performed in parallel. Furthermore, embodiments of the methods may be implemented in hardware, software, firmware, middleware, microcode, hardware description languages, or any combination thereof.

Figure 9C:
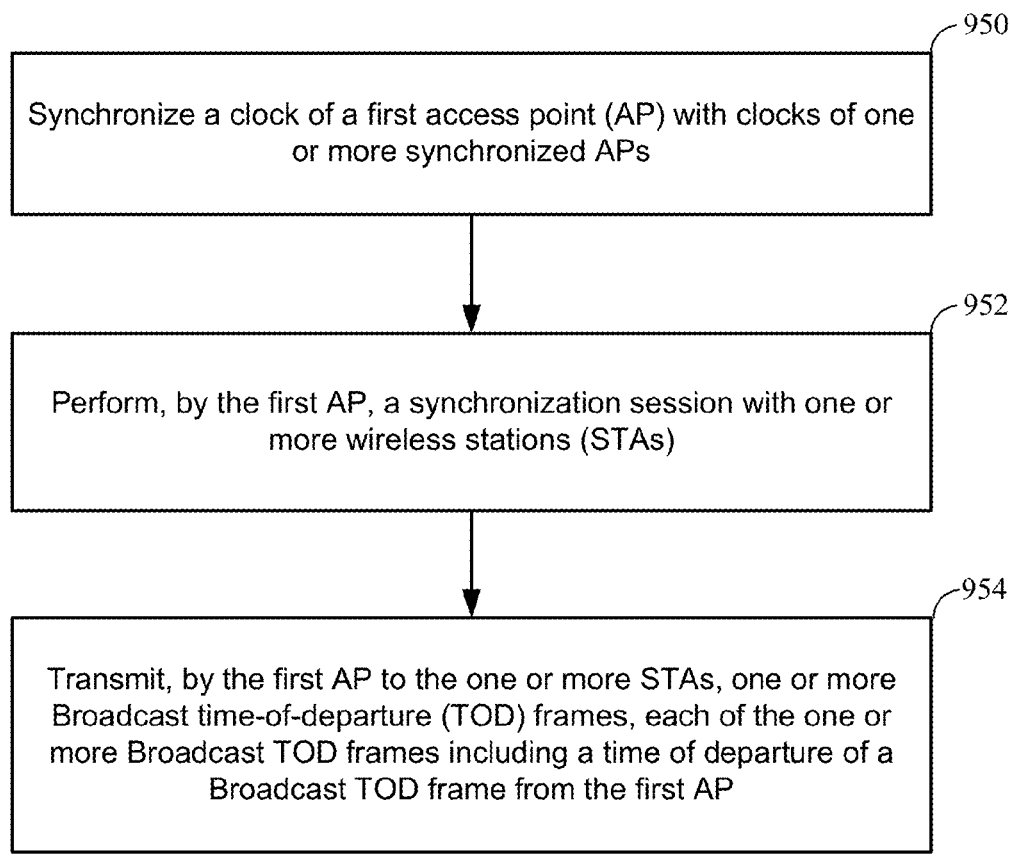
FIG. 9C is a flow chart illustrating an embodiment of a method of range and/or position determination using Broadcast TOD frames from an access point.

FIG. 9C is a flow chart 940 illustrating an embodiment of a method of range and/or position determination using Broadcast TOD frames from an AP.

At block 950, a first AP, such as AP1 320 of FIG. 3A, may synchronize its clock with clocks of one or more synchronized APs, such as AP2 330 and AP3 340 of FIG. 3A. The synchronization of the APs may be accomplished through, for example, a centralized server or a synchronization AP. In some embodiments, means for performing the function at block 950 may include, but are not limited to, for example, wireless communication subsystem 1030, processing unit 1010, memory 1060, clock 1045, and/or bus 1005 as illustrated in FIG. 10 and described in detail below. In some embodiments, means for performing the function at block 950 may include, but are not limited to, for example, wireless communications subsystem 1133, processing unit 1110, working memory 1135, clock 1150, and/or bus 1105 as illustrated in FIG. 11 and described in detail below.

At block 952, the first AP, such as AP1 320 of FIG. 3A, may be used to synchronize with one or more STAs, such as STA 310 in FIG. 3A. In some embodiments, one AP of the one or more synchronized APs may be used to synchronize with each of the one or more STAs. In some embodiments, one AP of the one or more synchronized APs may be used to synchronize with some of the one or more STAs, while other APs of the one or more synchronized APs may be used to synchronize with other STAs of the one or more STAs. The synchronization may be achieved through an FTM session, such as FTM session 200 described above with respect to FIG. 2. Through the FTM session, the one or more synchronized APs, such as AP1 320, AP2 330, and AP3 340, may synchronize with each of one or more STAs, such as STA 310. In some embodiments, means for performing the function at block 952 may include, but are not limited to, for example, wireless communication subsystem 1030, processing unit 1010, memory 1060, clock 1045, and/or bus 1005 as illustrated in FIG. 10 and described in detail below. In some embodiments, means for performing the function at block 952 may include, but are not limited to, for example, wireless communications subsystem 1133, processing unit 1110, working memory 1135, clock 1150, and/or bus 1105 as illustrated in FIG. 11 and described in detail below.

At block 954, the first AP, such as AP1 320 of FIG. 3A, may transmit one or more Broadcast TOD frames to the one or more STAs, such as STA 310. Each of the one or more Broadcast TOD frames may include a time of departure of a Broadcast TOD frame from the first AP, and optionally, information regarding an accuracy of a timer of the first AP, for the one or more STAs receiving the Broadcast TOD frames to determine a range between the first AP and each of the one or more STAs. The Broadcast TOD frames may also include one or more of the location information of the first AP, and the TSF offset and/or ppm offset between the first AP and one or more other APs that are synchronized with the first AP. The format of each Broadcast TOD frame may be any one of the examples described above with respect to FIGS. 4A-6B, or any appropriate variation thereof. The Neighbor Report field, if used, may be similar to any one of the examples described above with respect to FIGS. 7A-8C, or any variation thereof. In some embodiments, means for performing the function at block 954 may include, but are not limited to, for example, wireless communication subsystem 1030, processing unit 1010, memory 1060, and/or bus 1005 as illustrated in FIG. 10 and described in detail below. In some embodiments, means for performing the function at block 954 may include, but are not limited to, for example, wireless communications subsystem 1133, processing unit 1110, working memory 1135, and/or bus 1105 as illustrated in FIG. 11 and described in detail below.

Figure 9D:
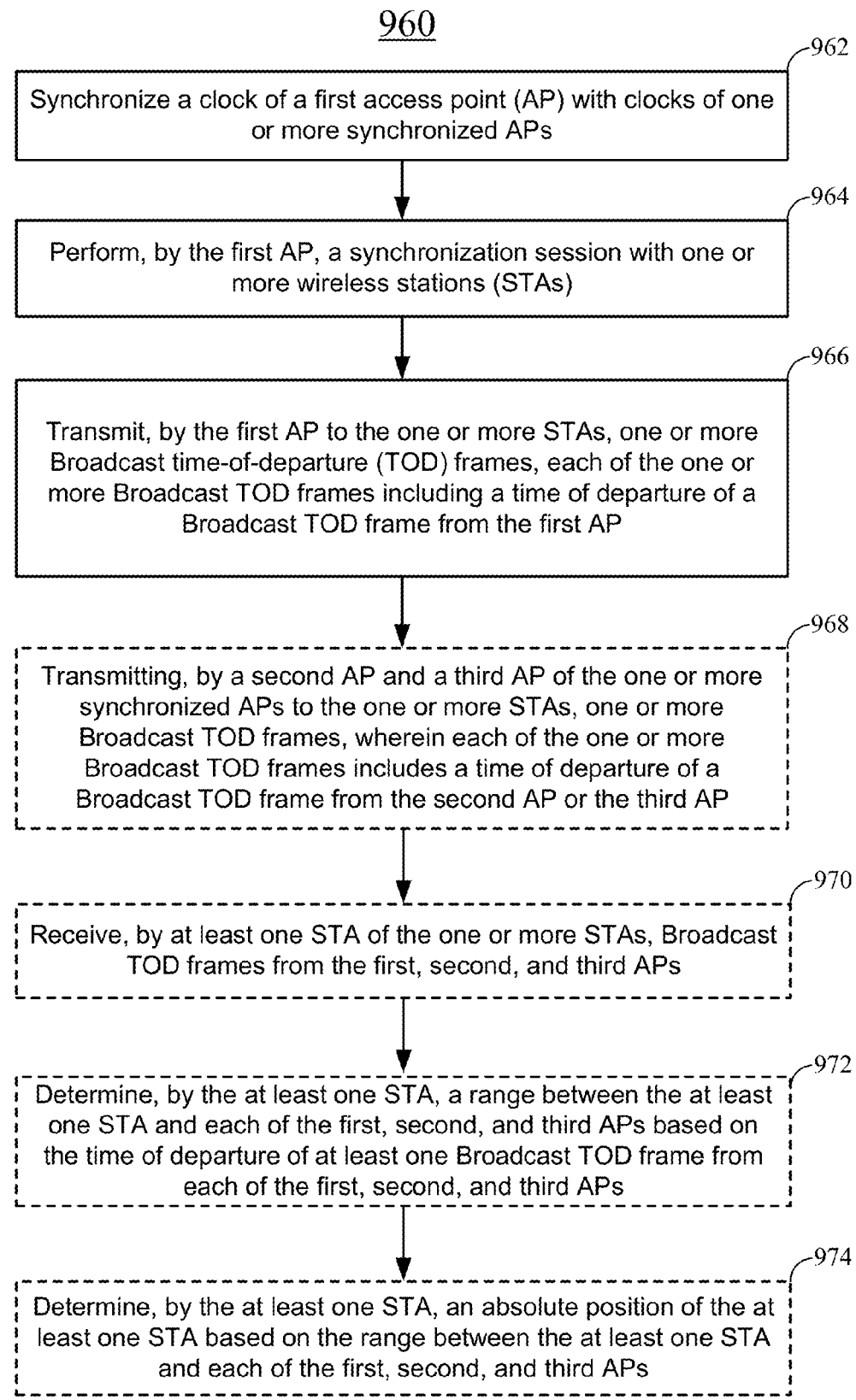
FIG. 9D is a flow chart illustrating another embodiment of a method of range and/or position determination using Broadcast TOD frames from an access point.

FIG. 9D is a flow chart 960 illustrating another embodiment of a method of range and/or position determination using Broadcast TOD frames from an AP.

At block 962, a first AP may synchronize its clock with clocks of one or more synchronized APs as described above with respect to block 950 of FIG. 9C. At block 964, the first AP may perform a synchronization session with one or more STAs as described above with respect to block 952 of FIG. 9C. At block 966, the first AP may transmit one or more Broadcast TOD frames to the one or more STAs as described above with respect to block 954 of FIG. 9C. Each of the one or more Broadcast TOD frames may include a time of departure of a Broadcast TOD frame from the first AP.

At block 968, optionally, a second AP and a third AP of the one or more synchronized APs, such as AP2 330 and AP3 340, may transmit one or more Broadcast TOD frames to the one or more STAs, such as STA 310. Each of the one or more Broadcast TOD frames may include a time of departure of a Broadcast TOD frame from the second AP, such as AP2 330, or the third AP, such as AP3 340, and, optionally, information regarding an accuracy of a timer of the second AP AP2 330 or the third AP AP3 340, for the one or more STAs receiving the Broadcast TOD frames to determine a range between the second AP and each of the one or more STAs, and a range between the third AP and each of the one or more STAs. The Broadcast TOD frames may also include one or more of the location information of the second AP or the third AP, and the TSF offset and/or ppm offset between the second AP or the third AP and one or more other APs that are synchronized with the second and the third APs. The format of each Broadcast TOD frame may be any one of the examples described above with respect to FIGS. 4A-6B, or any appropriate variation thereof. The Neighbor Report field, if used, may be similar to any one of the examples described above with respect to FIGS. 7A-8C, or any variation thereof. In some embodiments, means for performing the function at block 968 may include, but are not limited to, for example, wireless communication subsystem 1030, processing unit 1010, memory 1060, and/or bus 1005 as illustrated in FIG. 10 and described in detail below. In some embodiments, means for performing the function at block 968 may include, but are not limited to, for example, wireless communications subsystem 1133, processing unit 1110, working memory 1135, and/or bus 1105 as illustrated in FIG. 11 and described in detail below.

At block 970, at least one STA of the one or more STAs may receive Broadcast TOD frames from the first, second, and third APs. In some embodiments, means for performing the function at block 970 may include, but are not limited to, for example, wireless communication subsystem 1030, processing unit 1010, memory 1060, and/or bus 1005 as illustrated in FIG. 10 and described in detail below. In some embodiments, means for performing the function at block 970 may include, but are not limited to, for example, wireless communications subsystem 1133, processing unit 1110, working memory 1135, and/or bus 1105 as illustrated in FIG. 11 and described in detail below.

At block 972, based on the time of departure of at least one Broadcast TOD frame from each of the first, second, and third APs, such as AP1 320, AP2 330, and the AP3 340, and, optionally, the information regarding the accuracy of the timer of the first AP AP1 320, the second AP AP2 330, and the third AP AP3 340, the at least one STA, such as STA 310, may determine a time of flight of the at least one Broadcast TOD frame from each of the first, second, and third APs to STA 310, using a time of arrival of the at least one Broadcast TOD frame from each of the first, second, and third APs at STA 310, and then determine a range between STA 310 and each of the first AP AP1 320, the second AP AP2 330, and the third AP AP3 340. In some embodiments, STA 310 may also adjust the received TOD from the first AP AP1 320, the second AP AP2 330, and the third AP AP3 340 based on the information regarding the accuracy of the timer of the first AP AP1 320, the second AP AP2 330, and the third AP AP3 340, and/or the TSF offset and ppm offset of the first AP AP1 320, the second AP AP2 330, and the third AP AP3 340 relative to other APs of the one or more synchronized APs in the received Broadcast TOD frames. The adjusted TOD for the first AP AP1 320, the second AP AP2 330, and the third AP AP3 340 can then be used to determine the time of flight of the Broadcast TOD frames, and therefore the range, between STA 310 and the first AP AP1 320, the second AP AP2 330, or the third AP AP3 340, using the TOA of the Broadcast TOD frames at STA 310. In some embodiments, means for performing the function at block 972 may include, but are not limited to, for example, processing unit 1010, memory 1060, clock 1045, and/or bus 1005 as illustrated in FIG. 10 and described in detail below. In some embodiments, means for performing the function at block 972 may include, but are not limited to, for example, processing unit 1110, working memory 1135, clock 1150, and/or bus 1105 as illustrated in FIG. 11 and described in detail below.

At block 974, the at least one STA, such as STA 310, may determine an absolute position of itself based on the ranges between STA 310 and the first AP AP1 320, the second AP AP2 330, and the third AP AP3 340. The determination of the absolute position of STA 310 may also be based on the location information of each of the broadcasting APs, such as AP1 320, AP2 330, and AP3 340. The location information may be obtained through the Broadcast TOD frames or an FQDN server identified in the Broadcast TOD frames. In some embodiments, means for performing the function at block 974 may include, but are not limited to, for example, processing unit 1010, memory 1060, and/or bus 1005 as illustrated in FIG. 10 and described in detail below. In some embodiments, means for performing the function at block 974 may include, but are not limited to, for example, processing unit 1110, working memory 1135, and/or bus 1105 as illustrated in FIG. 11 and described in detail below.

As described above with respect to FIGS. 3B and 3C, the TOD value in the Broadcast TOD frames may be the TOD value of the previous Broadcast TOD frame or the current Broadcast TOD frame at the broadcasting AP.

It is noted that even though FIGS. 9C and 9D describe the operations as a sequential process, many of the operations can be performed in parallel or concurrently. In addition, the order of the operations may be rearranged. An operation may have additional steps not included in the figure. Some operations may be optional, and thus may be omitted in various embodiments. Some operations described in one block may be performed together with operations at another block. For example, operations in block 966 and block 968 of FIG. 9D may be performed in parallel. Furthermore, embodiments of the methods may be implemented in hardware, software, firmware, middleware, microcode, hardware description languages, or any combination thereof.

VIII. Device and System Examples

FIG. 10 illustrates an embodiment of a wireless device 1000, which can be utilized as described herein above. For example, wireless device 1000 can be used as an AP and/or STA as described in relation to the embodiments previously provided herein. It should be noted that FIG. 10 is meant only to provide a generalized illustration of various components, any or all of which may be utilized as appropriate. It can be noted that, in some instances, components illustrated by FIG. 10 can be localized to a single physical device and/or distributed among various networked devices, which may be disposed at different physical locations. In some embodiments, for example, wireless device 1000 can be a cellular telephone or other mobile electronic device. In some embodiments, wireless device 1000 may be a stationary device, such as an AP. As such, as previously indicated, components may vary from embodiment to embodiment.

Wireless device 1000 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG.

10, some embodiments may have a separate DSP 1020, depending on desired functionality. Wireless device 1000 also can include one or more input devices 1070, which can include without limitation a touch screen, a touch pad, microphone, button(s), dial(s), switch(es), and/or the like; and one or more output devices 1015, which can include without limitation a display, light emitting diodes (LEDs), speakers, and/or the like.

Wireless device 1000 might also include a wireless communication subsystem 1030, which can include without limitation a modem, a network card, an infrared communication device, a wireless communication device, and/or a chipset (such as a Bluetooth device, an IEEE 802.11 device (e.g., a device utilizing one or more of the 802.11 standards described herein), an IEEE 802.15.4 device, a WiFi device, a WiMax device, cellular communication facilities, etc.), and/or the like. Wireless communication subsystem 1030 may permit data to be exchanged with a network, wireless access points, other computer systems, and/or any other electronic devices described herein, such as the configuration of FIGS. 1A-1C. The communication can be carried out via one or more wireless communication antenna(s) 1032 that send and/or receive wireless signals 1034.

Depending on desired functionality, wireless communication subsystem 1030 can include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 1002.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A WLAN may be an IEEE 802.11x network. A WPAN may be a Bluetooth network, an IEEE 802.15x, or some other type of network. The techniques described herein may also be used for any combination of WWAN, WLAN and/or WPAN.

Wireless device 1000 may include a clock 1045 on bus 1005, which can generate a signal to synchronize various components on bus 1005. Clock 1045 may include an inductor-capacitor (LC) oscillator, a crystal oscillator, a ring oscillator, a digital clock generator such as a clock divider or clock multiplexer, a phase locked loop, or other clock generator. As indicated previously, the clock may be synchronized (or substantially synchronized) with corresponding clocks on other wireless devices. Clock 1045 may be driven by wireless communication subsystem 1030, which may be used to synchronize clock 1045 of wireless device 1000 to one or more other devices.

Wireless device 1000 can further include sensor(s) 1040. Such sensors can include, without limitation, one or more accelerometer(s), gyroscope(s), camera(s), magnetometer(s), altimeter(s), microphone(s), proximity sensor(s), light sensor(s), and the like. Some or all of sensor(s) 1040 can be utilized, among other things, for dead reckoning and/or other positioning methods. Such positioning methods may be used to determine a location of wireless device 1000, and may utilize and/or complement the RTT values obtained using FTM techniques described herein.

Embodiments of the mobile device may also include a Standard Positioning Service (SPS) receiver 1080 capable of receiving signals 1084 from one or more SPS satellites using an SPS antenna 1082. Such positioning can be utilized to complement and/or incorporate the techniques for calculating RTT described herein. SPS receiver 1080 can extract a position of the mobile device, using conventional techniques, from SPS satellite vehicles (SVs) of an SPS system, such as global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, SPS receiver 1080 can use various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS system may include any combination of one or more global and/or regional navigation satellite systems and/or augmentation systems, and SPS signals may include SPS, SPS-like, and/or other signals associated with one or more such SPS systems.

Wireless device 1000 may further include and/or be in communication with a memory 1060. Memory 1060 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Memory 1060 of wireless device 1000 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above, such as the methods shown in FIGS. 8 and/or 9 might be implemented as code and/or instructions executable by wireless device 1000, a processing unit within wireless device 1000, and/or another device of a wireless system. In an aspect, such code and/or instructions can be used to configure and/or adapt a general purpose computer (or other device) to perform one or more operations in accordance with the described methods.

FIG. 11 illustrates components of a computing system 1100, according to one embodiment. For example, computing system 1100 can be used as an AP as described in relation to the embodiments previously provided herein, and may communicate in a wireless communication system with one or more STAs, as previously discussed. In contrast to the wireless device 1000 of FIG. 10 which may be mobile, computing system 1100 of FIG. 11 may, for example, be a stationary device (or set of devices). It should be noted that FIG. 11 is meant only to provide a generalized illustration of various components, any or all of which may be utilized as appropriate. Moreover, system elements may be implemented in a relatively separated or relatively more integrated manner.

Computing system 1100 is shown comprising hardware elements that can be electrically coupled via a bus 1105 (or may otherwise be in communication, as appropriate). The hardware elements may include a processing unit 1110, including without limitation one or more general-purpose processors and/or one or more special-purpose processors (such as digital signal processing chips, graphics acceleration processors, and/or the like), one or more input devices 1115, and one or more output devices 1120. Input device(s) 1115 can include without limitation camera(s), a touchscreen, a touch pad, microphone(s), a keyboard, a mouse, button(s), dial(s), switch(es), and/or the like. Output devices 1120 may include without limitation a display device, a printer, light emitting diodes (LEDs), speakers, and/or the like.

Computing system 1100 can also include a wired communications subsystem 1130 and wireless communication technologies managed and controlled by a wireless communication subsystem 1133. As such, wired communications subsystem 1130 and wireless communications subsystem 1133 can include, without limitation, a modem, a network interface (wireless, wired, both, or other combination thereof), an infrared communication device, a wireless communication device, and/or a chipset (such as a Bluetooth™ device, an IEEE 802.11 device (e.g., a device utilizing one or more of the IEEE 802.11 standards described herein), a WiFi device, a WiMax device, cellular communication facilities, etc.), and/or the like. Subcomponents of the network interface may vary, depending on the type of computing system 1100 (e.g., mobile phone, personal computer, etc.). Wired communications subsystem 1130 and wireless communications subsystem 1133 may include one or more input and/or output communication interfaces to permit data to be exchanged with a data network, other computer systems, and/or any other devices described herein. Moreover, wired communications subsystem 1130 and/or wireless communications subsystem 1133 may permit computing system 1100 to determine RTT via uplink (UL) multiple-input multiple-output (MIMO) processes.

Similar to wireless device 1000 of FIG. 10, computer system 1100 of FIG. 11 may include a clock 1150 on bus 1105, which can generate a signal to synchronize the various components on bus 1105. Clock 1150 may include an LC oscillator, a crystal oscillator, a ring oscillator, a digital clock generator such as a clock divider or clock multiplexer, a phase locked loop, or other clock generator. The clock may be synchronized (or substantially synchronized) with corresponding clocks on other wireless devices while performing the techniques described herein. Clock 1150 may be driven by wireless communication subsystem 1133, which may be used to synchronize clock 1150 of computer system 1100 to one or more other devices.

Computing system 1100 may further include (and/or be in communication with) one or more non-transitory storage devices 1125, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like. For instance, storage device(s) 1125 may include a database 1127 (or other data structure) configured to store timestamp values as described in embodiments herein, which may be provided to APs and/or other devices via wired communications subsystem 1130 or wireless communications subsystem 1133.

In many embodiments, computing system 1100 may further comprise a working memory 1135, which can include a RAM or ROM device, as described above. Software elements, shown as being currently located within working memory 1135, can include an operating system 1140, device drivers, executable libraries, and/or other code, such as one or more application programs 1145, which may comprise software programs provided by various embodiments, and/or may be designed to implement methods, and/or configure systems, provided by other embodiments, as described herein, such as some or all of the methods described in relation to FIGS. 2-9. Merely by way of example, one or more procedures described with respect to the method(s) discussed above might be implemented as code and/or instructions executable by a computer (and/or a processor within a computer). In an aspect, such code and/or instructions can be used to configure and/or adapt a general purpose computer (or other device) to perform one or more operations in accordance with the described methods.

A set of these instructions and/or code might be stored on a non-transitory computer-readable storage medium, such as non-transitory storage device(s) 1125 described above. In some cases, the storage medium might be incorporated within a computer system, such as computing system 1100. In other embodiments, the storage medium might be separate from a computer system (e.g., a removable medium, such as a flash drive), and/or provided in an installation package, such that the storage medium can be used to program, configure, and/or adapt a general purpose computer with the instructions/code stored thereon. These instructions might take the form of executable code, which is executable by computing system 1100 and/or might take the form of source and/or installable code, which, upon compilation and/or installation on computing system 1100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The terms "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a cellular transceiver device, utilized to extend cellular telephone service into a business or home. In such an implementation, one or more mobile devices may communicate with a cellular transceiver device via a code division multiple access ("CDMA") cellular communication protocol, for example.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, are intended to include SPS-like signals from terrestrial transmitters, including terrestrial transmitters acting as pseudolites or equivalents of pseudolites.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A method of range measurement between one or more wireless stations (STAs) and a first access point (AP), the method comprising:
   synchronizing a clock of the first AP with clocks of one or more synchronized APs;
   performing, by the first AP, a synchronization session with the one or more STAs; and
   broadcasting, by the first AP without receiving a request from the one or more STAs, one or more Broadcast time-of-departure (TOD) frames to the one or more STAs, each of the one or more Broadcast TOD frames including a time of departure of a Broadcast TOD frame from the first AP.

2. The method of claim 1, wherein a subsequent Broadcast TOD frame of the one or more Broadcast TOD frames includes a time of departure of a last or the subsequent Broadcast TOD frame from the first AP.

3. The method of claim 1, wherein performing the synchronization session with the one or more STAs comprises:
performing, by the first AP, a fine timing measurement (FTM) session with one of the one or more STAs.

4. The method of claim 1, wherein at least one of the one or more Broadcast TOD frames includes information regarding an accuracy of a timer of the first AP.

5. The method of claim 4, wherein the information regarding the accuracy of the timer of the first AP includes a ppm estimate of the accuracy of the timer of the first AP or information of a fully qualified domain name server storing information of the first AP.

6. The method of claim 4, wherein the information regarding the accuracy of the timer of the first AP includes a neighbor report of the accuracy of the timer of the first AP relative to other APs of the one or more synchronized APs.

7. The method of claim 6, wherein the neighbor report includes at least one of an offset or a fractional portion of the offset between the timer of the first AP and a timer of another AP of the one or more synchronized APs.

8. The method of claim 6, wherein the neighbor report includes a ppm offset between a drift of the timer of the first AP and a drift of a timer of another AP of the one or more synchronized APs.

9. The method of claim 8, wherein the ppm offset is included in an existing subelement or a reserved subelement of the neighbor report.

10. The method of claim 1, wherein the one or more Broadcast TOD frames from the first AP include Broadcast TOD frames of different formats.

11. The method of claim 1, wherein at least one of the one or more Broadcast TOD frames from the first AP includes a location configuration information (LCI) report of the first AP.

12. The method of claim 1, wherein at least one of the one or more Broadcast TOD frames from the first AP includes a fractional portion of a timestamp of the first AP.

13. The method of claim 1, further comprising:
broadcasting, by a second AP and a third AP of the one or more synchronized APs to the one or more STAs, one or more Broadcast TOD frames, wherein each of the one or more Broadcast TOD frames includes a time of departure of a Broadcast TOD frame from the second AP or the third AP.

14. An access point (AP) comprising:
a clock;
a wireless communication subsystem; and
a processing unit communicatively coupled with the clock and the wireless communication subsystem, the processing unit being configured to:
synchronize the clock of the AP with clocks of one or more other APs;
perform a synchronization session with one or more wireless stations (STAs); and
broadcast, without receiving a request from the one or more STAs, one or more Broadcast time-of-departure (TOD) frames to the one or more STAs through the wireless communication subsystem, wherein each of the one or more Broadcast TOD frames includes a time of departure of a Broadcast TOD frame from the AP.

15. The access point of claim 14, wherein the processing unit is configured to perform the synchronization session with the one or more STAs through a fine timing measurement (FTM) session.

16. The access point of claim 14, wherein at least one of the one or more Broadcast TOD frames includes information regarding an accuracy of the clock of the AP.

17. The access point of claim 16, wherein the information regarding the accuracy of the clock of the AP includes a ppm estimate of the accuracy of the clock of the AP or information of a fully qualified domain name server storing information of the AP.

18. The access point of claim 16, wherein the information regarding the accuracy of the clock of the AP includes a neighbor report of the accuracy of the clock of the AP relative to clocks of the one or more other APs.

19. The access point of claim 18, wherein the neighbor report includes at least one of an offset or a fractional portion of the offset between the clock of the AP and clocks of the one or more other APs, or a ppm offset between a drift of the clock of the AP and drifts of the clocks of the one or more other APs.

20. The access point of claim 14, wherein the one or more Broadcast TOD frames from the AP include Broadcast TOD frames of different formats.

21. A method of range measurement between a wireless station (STA) and one or more synchronized access points (APs), the method comprising:
performing, by the STA, a synchronization session with a first AP in a network of synchronized APs;
receiving, by the STA without sending a request to a second AP in the network of synchronized APs, one or more Broadcast time-of-departure (TOD) frames broadcasted by the second AP in the network of synchronized APs, wherein each of the one or more Broadcast TOD frames includes a time of departure of a Broadcast TOD frame from the second AP; and
determining, by the STA, a range between the STA and the second AP based on the time of departure of at least one Broadcast TOD frame from the second AP.

22. The method of claim 21, wherein the first AP and the second AP are a same AP.

23. The method of claim 21, wherein the synchronization session is a fine timing measurement session between the STA and the first AP.

24. The method of claim 21, wherein at least one of the one or more Broadcast TOD frames includes information regarding an accuracy of a timer of the second AP.

25. The method of claim 24, further comprising:
adjusting, by the STA, the time of departure of the Broadcast TOD frame from the second AP based on the information regarding the accuracy of the timer of the second AP.

26. The method of claim 24, wherein the information regarding the accuracy of the timer of the second AP includes at least one of a ppm estimate of the accuracy of the timer of the second AP, information of a fully qualified domain name server storing information of the second AP, or a neighbor report of the accuracy of the timer of the second AP relative to other APs in the network of synchronized APs.

27. The method of claim 21, further comprising:
receiving, by the STA, one or more Broadcast TOD frames from each of a third AP and a fourth AP in the network of synchronized APs, wherein each of the one or more Broadcast TOD frames includes a time of departure of a Broadcast TOD frame from the third AP or the fourth AP;
determining, by the STA, a range between the STA and the third AP and a range between the STA and the fourth AP based on the time of departure of the one or more Broadcast TOD frames from the third AP or the fourth AP; and determining, by the STA, an absolute position of the STA based on the range between the STA and the second AP, the range between the STA and the third AP, and the range between the STA and the fourth AP.

28. A wireless station (STA) comprising:

a clock;

a wireless communication subsystem; and a processing unit communicatively coupled with the clock and the wireless communication subsystem, the processing unit being configured to:

perform a synchronization session with a first AP in a network of synchronized APs;

receive, without sending a request to a second AP in the network of synchronized APs, one or more Broadcast time-of-departure (TOD) frames broadcasted by the second AP in the network of synchronized APs through the wireless communication subsystem, wherein each of the one or more Broadcast TOD frames includes a time of departure of a Broadcast TOD frame from the second AP; and determine a range between the STA and the second AP based on the time of departure of at least one Broadcast TOD frame from the second AP.

29. The wireless station of claim 28, wherein the one or more Broadcast TOD frames include information regarding an accuracy of a timer of the second AP, and wherein determining the range between the STA and the second AP includes adjusting the time of departure of the one or more Broadcast TOD frames from the second AP based on the information regarding the accuracy of the timer of the second AP.

30. The wireless station of claim 28, wherein the processing unit is further configured to determine an absolute position of the STA based on ranges between the STA and three or more APs in the network of synchronized APs.

* * * * *